(12) United States Patent
Saito et al.

(10) Patent No.: US 12,522,754 B2
(45) Date of Patent: Jan. 13, 2026

(54) DYNAMICALLY CROSSLINKED TOUGH ADHESIVE WITH RECYCLABILITY

(71) Applicant: UT-Battelle, LLC, Oak Ridge, TN (US)

(72) Inventors: Tomonori Saito, Knoxville, TN (US); Md Anisur Rahman, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 533 days.

(21) Appl. No.: 17/867,861

(22) Filed: Jul. 19, 2022

(65) Prior Publication Data

US 2023/0044696 A1    Feb. 9, 2023

Related U.S. Application Data

(60) Provisional application No. 63/223,606, filed on Jul. 20, 2021.

(51) Int. Cl.

| | | |
|---|---|---|
| *C09J 11/06* | (2006.01) | |
| *C09J 7/10* | (2018.01) | |
| *C09J 7/38* | (2018.01) | |
| *C09J 11/04* | (2006.01) | |
| *C09J 125/06* | (2006.01) | |

(52) U.S. Cl.
CPC ............ *C09J 125/06* (2013.01); *C09J 7/10* (2018.01); *C09J 7/381* (2018.01); *C09J 11/04* (2013.01); *C09J 11/06* (2013.01); *C09J 2301/302* (2020.08); *C09J 2301/408* (2020.08); *C09J 2301/502* (2020.08); *C09J 2400/123* (2013.01); *C09J 2400/143* (2013.01); *C09J 2400/163* (2013.01)

(58) Field of Classification Search
CPC ... C09J 125/06; C09J 7/10; C09J 7/381; C09J 11/04; C09J 11/06; C09J 2301/302; C09J 2301/408; C09J 2301/502; C09J 2400/123; C09J 2400/143; C09J 2400/163; C09J 153/025; C09J 11/02; C08K 3/22; C08K 3/36; C08K 5/0025; C08K 5/55; C08K 2003/2227; C08K 2003/2241; C08K 2003/2244; C08K 2201/005
See application file for complete search history.

(56) References Cited

U.S. PATENT DOCUMENTS

| | | | |
|---|---|---|---|
| 8,137,641 B2 * | 3/2012 | Moles | B01L 3/502707 216/48 |
| 10,576,185 B2 | 3/2020 | Weaver et al. | |
| 2015/0159068 A1 | 6/2015 | Schubert et al. | |
| 2017/0015847 A1 * | 1/2017 | Duncan | C09D 7/61 |

FOREIGN PATENT DOCUMENTS

WO    2007/033353 A2    3/2007

OTHER PUBLICATIONS

Liu (J. Liu et al, Boronic acid functionalized particles with flexible three dimensional polymer branch for highly specific recognition of glycoproteins (ACS Appl. Mater. Interfaces, 2016, 8, 9552-9556).*
Bapat, A.P., et al., "Bulk network polymers with dynamic B—O bonds: healable and reprocessable materials", Materials Horizons, 2020, Received Aug. 6, 2019, Accepted Oct. 23, 2019, pp. 694-714, 7.
Chen, Y., et al., "Covalently Cross-Linked Elastomers with Self-Healing and Malleable Abilities Enabled by Boronic Ester Bonds", ACS Applied Materials & Interfaces 2018, Received Jun. 13, 2018, Accepted Jun. 26, 2018, Published Jun. 26, 2018, p. 24224-24231, 10.
International Search Report and Written Opinion dated Nov. 15, 2022 received in PCT/US22/37545, 10 pages.
Lai, J.-C., et al., "A Stiff and Healable Polymer Based on Dynamic-Covalent Boroxine Bonds", Advanced Materials 2016, Received May 2, 2016, Revised Jun. 15, 2016, Published online Jul. 8, 2016, pp. 8277-8282, 28.

(Continued)

*Primary Examiner* — Kumar R Bhushan
(74) *Attorney, Agent, or Firm* — Scully, Scott, Murphy & Presser, P.C.

(57) ABSTRACT

A crosslinked adhesive composition comprising: (i) a polymer; (ii) solid particles embedded within the polymer; and (iii) a multiplicity of boronate linkages crosslinking between the polymer and solid particles, wherein the boronate linkages have the formula

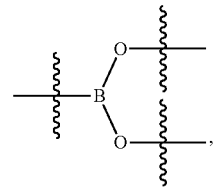

wherein the polymer and particles are connected to each other through the boronate linkages, and the crosslinked adhesive composition has an ability to bond surfaces and a further ability to thermally debond and rebond the surfaces. Also described herein is a method of bonding first and second surfaces together, the method comprising placing the above-described crosslinked adhesive composition onto the first surface and pressing the second surface onto the crosslinked adhesive composition on the first surface.

13 Claims, 20 Drawing Sheets

(56) References Cited

OTHER PUBLICATIONS

Liu, J., et al., "Boronic Acid-Functionalized Particles with Flexible Three-Dimensional Polymer Branch for Highly Specific Recognition of Glycoproteins", ACS Applied Materials & Interfaces 2016, Received Feb. 12, 2016, Accepted Apr. 6, 2016, Published: Apr. 6, 2016, pp. 9552-9556, 8.
Mohanty, A.D., et al., "Stable Elastomeric Anion Exchange Membranes Based on Quaternary Ammonium-Tethered Polystyrene-b-poly(ethylene-cobutylene)-b-polystyrene Triblock Copolymers", Macromolecules 2015, Received Jun. 24, 2015, Revised Sep. 4, 2015, Published Sep. 17, 2015, pp. 7085-7095, 48.
Rahman, M.A., et al., "Design of tough adhesive from commodity thermoplastics through dynamic crosslinking", Science Advances 2021, Oct. 15, 2021, 11 pages, 7 (42), eabk2451.
Rahman, M.A., et al., "Supplmenetary Materials for Design of tough adhesive from commodity thermoplastics through dynamic crosslinking", Science Advances 2021, Oct. 15, 2021, 35 pages, 7 (42), eabk2451.
Yang, Y., et al., "Highly Stretchable, Self-Healable, and Adhesive Polyurethane Elastomers Based on Boronic Ester Bonds", ACS Applied Polymer Materials 2020, Received Aug. 25, 2020, Accepted Oct. 15, 2020 Published Nov. 20, 2020, pp. 5630-5640, 2.

\* cited by examiner

Boronic Ester Exchange

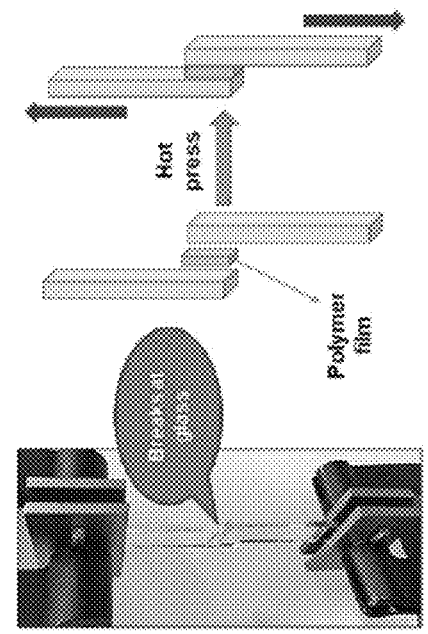
FIG. 5A
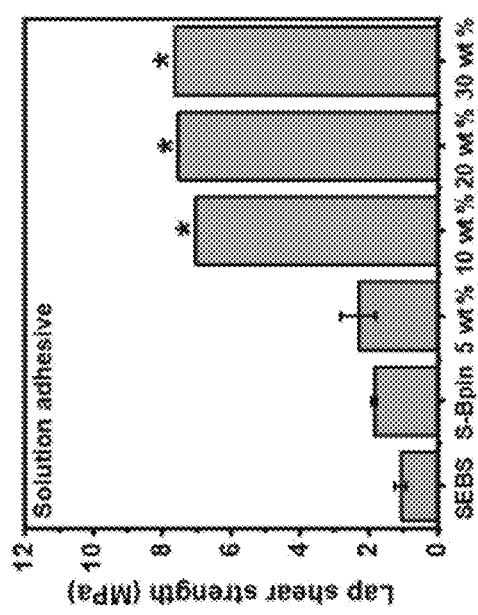
FIG. 5B
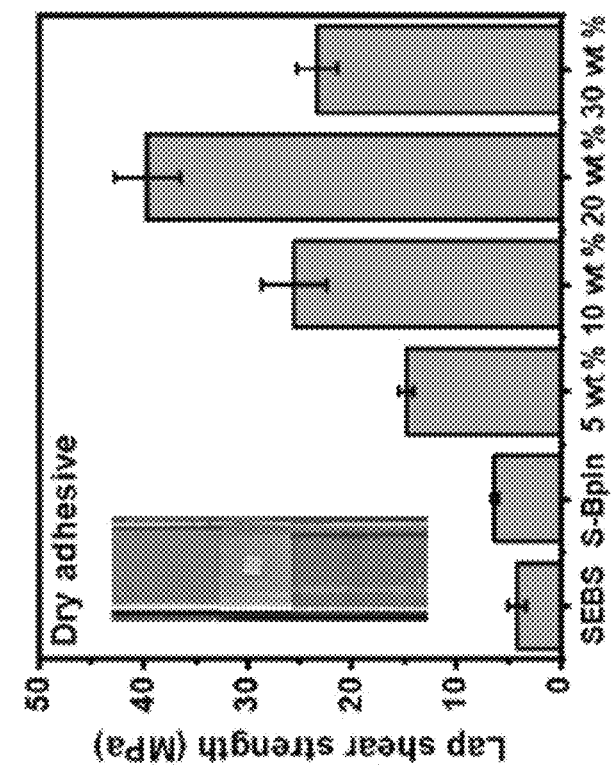
FIG. 5C
FIG. 5D

DYNAMICALLY CROSSLINKED TOUGH ADHESIVE WITH RECYCLABILITY

CROSS-REFERENCE TO RELATED APPLICATIONS

The present application claims benefit of U.S. Provisional Application No. 63/223,606, filed Jul. 20, 2021, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention generally relates to adhesive compositions and methods of bonding objects by use of adhesives. The invention more particularly relates to dynamic crosslinked adhesives containing boronate linkages, wherein the boronate linkages provide a dynamic covalent bonding characteristic.

BACKGROUND OF THE INVENTION

Load-bearing adhesives for structural applications, including epoxies, polyurethanes, and acrylics, typically provide strong adhesion, but their brittleness often leads to undesired cohesive failure. For example, epoxy-based high-strength adhesives are widely used but tend to be very brittle due to their low work of debonding. In contrast, the ductile adhesives, such as adhesives on tapes, generally possess a low level of adhesion but can dissipate mechanical stress through a soft matrix, thereby preventing sudden bond failure. Ductile adhesives are made of low modulus materials that limit them from being used in structural applications. Tough adhesives having both characteristics of strong and ductile adhesion are very rare and difficult to obtain since strength and ductility are generally in conflict or mutually exclusive. There remains a significant challenge in creating an adhesive that combines both strength and ductility. Tough adhesives containing this combination of properties are important to develop as they can withstand a high degree of debonding force. The long-lasting high load-bearing capability of tough adhesives will provide energy-efficient operation of devices and systems while minimizing adhesive failures in a number of industries, such as the electronic, construction, and automotive industries.

Moreover, most of the adhesives currently available are permanent adhesives, and are designed for single-use. Permanent adhesives are difficult to remove from the substrate and do not offer recyclability. Thus, ultimately, permanent adhesives end up being incinerated or released into the environment, which can be detrimental to the environment. Thus, there is a further yet unmet need for high strength adhesives that can removed and recycled.

SUMMARY OF THE INVENTION

The present disclosure provides a novel crosslinked adhesive with dynamic covalent interactions that impart toughness, exceptional strength, and ductility, along with reprocessability and recyclability. The present disclosure is more particularly directed to tough reversible/recyclable adhesive materials produced by incorporating dynamic covalent bonds of boronic ester into a polymer, wherein the polymer may be a commodity diblock, triblock, or random copolymer thermoplastic elastomer that reversibly binds with various fillers and substrates by dynamic crosslinking via boronate linkages. As further discussed later below, spectroscopic measurements and density functional theory calculations unveil versatile dynamic covalent binding of boronic ester with various hydroxy-terminated surfaces, such as silica nanoparticles, aluminum, steel, and glass. The designed multi-phase material exhibits exceptionally high adhesion strength and work of debonding along with a rebonding capability, as well as outstanding mechanical, thermal, and chemical resistance properties.

In one aspect, the present disclosure is directed to a crosslinked adhesive composition containing precisely or at least the following components: (i) a polymer; (ii) solid particles embedded within the polymer; and (iii) a multiplicity of boronate linkages crosslinking between the polymer and solid particles, wherein the boronate linkages have the formula

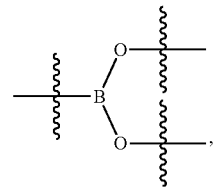 [SMILES: *OB(*)O*]

wherein the polymer and particles are connected to each other through the boronate linkages, and the crosslinked adhesive composition has an ability to bond surfaces.

In some embodiments, the boronate linkages also crosslink between different parts of the same polymer. In some embodiments, a second polymer is included in the composition, and the boronate linkages may also crosslink between the polymer and other polymer. In some embodiments, a crosslinker is included in the composition to crosslink between the polymer and the solid particles or between the polymer and another polymer or between different parts of the same polymer, and the boronate linkages may also crosslink between the polymer and crosslinker and/or between the polymer and another polymer and/or between different parts of the same polymer. In the composition, the polymer may be attached to the boron atom or the oxygen atoms of the boronate linkages, and/or another (second) polymer, if present, may be attached to the boron atom or the oxygen atoms of the boronate linkages, and/or the solid particles may be attached to the boron atom or the oxygen atoms of the boronate linkages, and/or a crosslinker, if present, may be attached to the boron atom or the oxygen atoms of the boronate linkages.

In another aspect, the present disclosure is directed to a method of bonding first and second surfaces together by placing a crosslinked adhesive composition onto the first surface and pressing the second surface onto the crosslinked adhesive composition on the first surface, wherein the crosslinked adhesive composition can be any of the compositions described above. The first and second surfaces may independently be selected from, for example, metal, glass, or ceramic surfaces. In some embodiments, the pressing is hot pressing. In some embodiments, the pressing includes solution casting followed by pressing, such as hot pressing. In some embodiments, in a successive step, the first and second surfaces are thermally debonded and then rebounded.

BRIEF DESCRIPTION OF THE DRAWINGS

FIG. 2A depicts the synthesis of crosslinked SiNP S-Bpin composites from S-Bpin and SiNPs, wherein S-Bpin was prepared from commodity polymer SEBS. FIG. 2B depicts the synthesis of a model compound to confirm the formation of B—O bond from phenylboronic pinacolester and SiNPs. FIG. 2C shows the result of DFT calculations confirming that covalent bonds can form between silicate surfaces and the polymer matrix (the bidentate binding geometry is depicted). FIG. 2D schematically depicts the dynamic boronic ester exchange crosslinking reaction between hydroxy groups on SiNPs and boronic ester groups of S-Bpin, which affords reprocessable materials.

FIG. 3A is a graph showing tensile stress-strain curves measured by tensile test. FIG. 3B is a graph showing toughness measured from the area underneath of tensile stress-strain curves. FIG. 3C is a graph showing shear storage modulus as a function of temperature measured by DMA. FIG. 3D is a graph showing stress relaxation of 10 wt % SiNPs S-Bpin composites in a temperature range from 230 to 260° C. FIG. 3E is a schematic representation showing polymer reprocessability of the composite described in this work. FIG. 3F is a graph showing tensile stress and strain properties of reprocessed 10 wt % SiNPs loaded samples. All error bars represent the standard error with at least three replicates.

FIG. 4A is a graph showing annealing time and temperature effect on the lap shear strength using aluminum substrates. FIG. 4B is a graph showing effect of silica nanoparticle loading on lap shear strength on aluminum substrates. FIG. 4C includes photos showing cohesive and adhesive failure of lap joint after adhesion test with 100 lb. load. FIG. 4D is a graph showing force-versus extension curve for 20 wt % SiNPs composite to show work of debonding and lap shear adhesion strength on aluminum substrates. FIG. 4E is a graph showing work of debonding for SEBS, S-Bpin, different silica-loaded nanocomposites, and J-B Weld (commercial epoxy-based glue) on aluminum substrates. FIG. 4F is a graph showing effect of silica nanoparticle loading on lap shear strength on steel substrates. All error bars represent the standard error with at least three replicates.

FIGS. 5A-5J. Lap shear adhesion on glass substrate, adhesive reusability, and comparison to the other adhesives. FIG. 5A is a graph showing lap shear adhesion on glass surfaces using the composite solution, and the asterisk (*) indicates that the adhesion may be much higher but may not be measurable due to glass substrate failure. FIG. 5B shows a lap shear adhesion set up for glass showing the glass fracture rather than breaking the adhesive bonds. FIG. 5C is a graphical representation of a lap shear adhesion test for composite films. FIG. 5D is a graph showing lap shear adhesion on a glass surface using composite films with reduced adhesive cross-section area of (3 mm×3 mm) 9 mm$^2$ and inset image showing the lap shear adhesion setup. FIG. 5E is a graph comparing adhesive performance of 20 wt % SiNPs S-Bpin sample on different substrates. FIG. 5F is a graph showing results of rebonding ability tests for the 20 wt % SiNPs S-Bpin solution on Al surface with adhesive cross-section area of (12 mm×12 mm) 144 mm$^2$. FIG. 5G is a graph showing results of rebonding ability tests for the 20 wt % SiNPs S-Bpin composite film on Al surface with adhesive cross-section area of (6 mm×6 mm) 36 mm$^2$. FIG. 5H is a graph comparing lap shear adhesion of dynamic covalent bond-based adhesives reported in the literature. FIG. 5I is a graph showing adhesive performance of 20 wt % SiNPs S-Bpin composite solution and dry film on Al and steel surfaces at 95° C. FIG. 5J schematically depicts a proposed mechanism of the adhesion process. All error bars represent the standard error with at least three replicates.

DETAILED DESCRIPTION OF THE INVENTION

Figure 1:
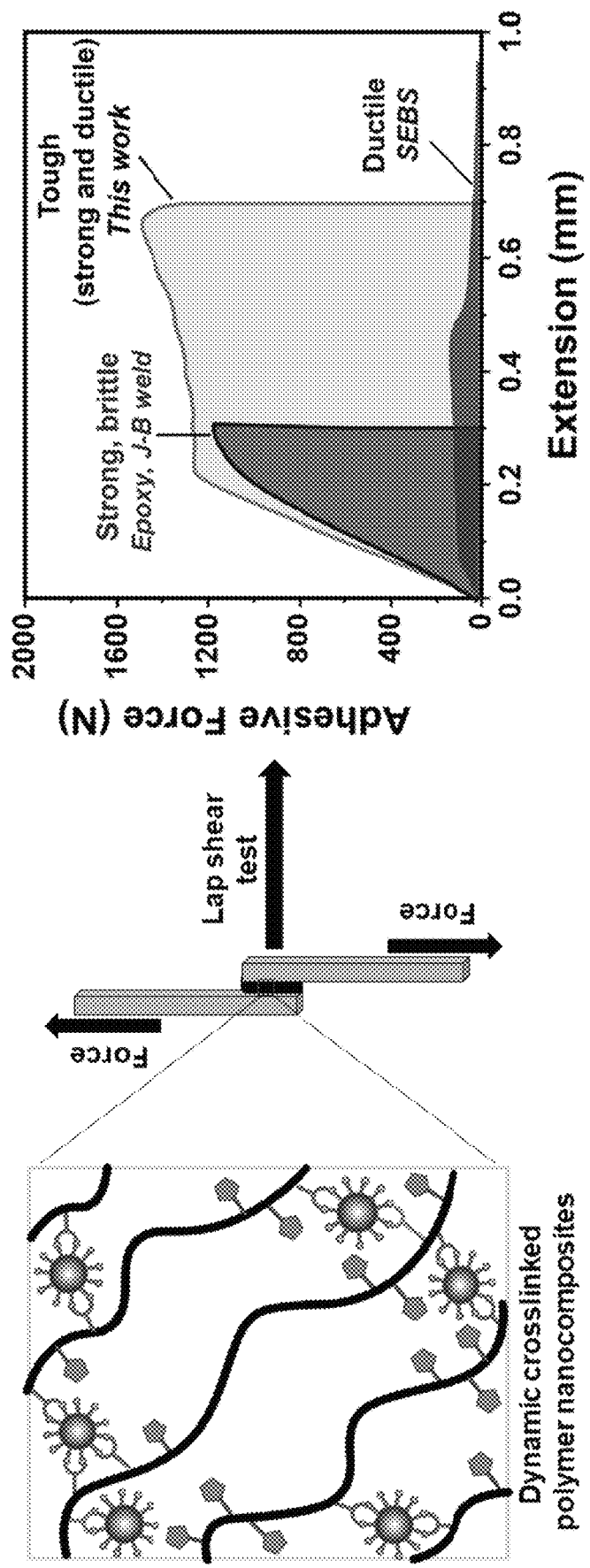
FIG. 1. A schematic illustration of boronic ester dynamic covalent bonding with the polymer matrix and silica nanoparticles (SiNPs). The schematic shows the joining of substrates with dynamically crosslinked nanocomposites (denoted as SiNPs S-Bpin composites) and the lap shear adhesion test. The graph is a representative force-versus-extension curve for strong but brittle (commercial adhesives such as J-B Weld, red curve), ductile but weak (SEBS, orange curve), and tough (this work, green curve) adhesive. J-B weld (epoxy) is a widely used strong adhesives, but its brittle nature results in low work of debonding (red curve); SEBS is widely used pressure-sensitive adhesive but very soft in nature (orange curve); while the SiNPs S-Bpin composite (of the present work) exhibit very strong and tough adhesive behavior with very high work of debonding (green curve). Dynamic covalent B—O bonds between silica and polymer matrix make a stronger and tougher adhesive.

In a first aspect, the present disclosure is directed to a crosslinked adhesive composition containing precisely or at least the following components: (i) a polymer (which may be a "first polymer" if another polymer is also present); (ii) solid particles (which may be a "first set of solid particles" if another set of solid particles is also present) embedded within the polymer; and (iii) a multiplicity of boronate linkages crosslinking between the polymer and solid particles, wherein the boronate linkages have the formula

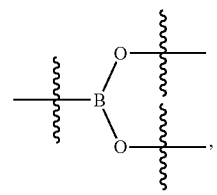 [SMILES: *OB(*)O*]

wherein the polymer and particles are connected to each other through the boronate linkages, and the crosslinked adhesive composition has an ability to bond surfaces. Notably, by virtue of the ability of the boronate linkages to form dynamic covalent bonds with a variety of surfaces, the adhesive composition not only has the ability to form exceptionally strong bonding between surfaces, but also the ability to thermally debond and can be re-used for rebonding the same or other surfaces. As further discussed below, the composition may or may not include any of the following additional components: another polymer, which may be a second or third polymer; a crosslinker that crosslinks between parts of the same polymer (and/or between parts of a second or third polymer, if present) or between the polymer and particles or between a first polymer and second polymer; a second set of solid particles different in composition from the first set of particles, wherein the second set of particles may or may not be crosslinked with the polymer via boronate linkages.

The polymer (component (i)), which may be a first, second, or third polymer, may be any of a wide variety of polymers, including, for example, any of the thermoplastic or thermoset polymers of the art, any of which may be elastomeric or non-elastomeric. The polymer may also be a homopolymer or a copolymer, wherein the copolymer may be, for example, a block, alternating, random, or branched copolymer and may be binary, ternary, quaternary, or higher level copolymer. In more specific embodiments, the polymer may be a diblock, triblock, tetrablock, or higher block copolymer. The polymer may more particularly be, for example, an addition polymer (e.g., vinyl-addition or polyurethane) or condensation polymer (e.g., polyester or polyamide). In the adhesive composition, the polymer is attached (e.g., by its backbone or pendant groups) to boron or oxygen atoms of the boronate linkages. In a first set of embodiments, the polymer contains ethylene, propylene, or butylene units, such as by being a copolymer containing a polyethylene (PE), polypropylene (PP), polybutylene (PB), or polybutadiene (PBD) block (i.e., segment), or by being a homopolymer of PE, PP, PB, or PBD. In a second set of embodiments, the polymer contains one or more aromatic units, such as styrene, thiophene, vinylpyridine, phenylene, phenylene vinylene, or aniline units, such as by being a copolymer containing a polystyrene (PS), polythiophene (PT), poly(vinylpyridine), polyphenylene, polyphenylene vinylene, or polyaniline block, or by being a homopolymer of any of the foregoing. In some embodiments, the polymer may be, more specifically, polystyrene or a copolymer thereof. In more specific embodiments, the polymer is a triblock copolymer possessing a polystyrene-b-(poly-alkylene)-b-polystyrene structure, wherein the alkylene segment may be, for example, an ethylene, propylene, or butylene segment or a copolymeric segment thereof (e.g., ethylene-co-butylene, ethylene-co-propylene, or propylene-co-butylene). In a third set of embodiments, the polymer contains one or more ethylene, propylene, or butylene units (or blocks) in combination with one or more aromatic-containing units (or blocks). In the case of aromatic polymers or segments thereof, the aromatic groups may be attached to the boronate linkage.

In some embodiments, the polymer, which may be any of the polymers described above, may be crosslinked. As well known, a polymer may be crosslinked by interconnecting at least two different locations of the polymer, typically via a crosslinker. In one embodiment, the polymer may be crosslinked via boronate linkages, i.e., in addition to boronate linkages connecting the polymer with the solid particles. Typically, in order for the polymer to be crosslinked by boronate linkages, an organic crosslinker connects between boronate linkages. In a typical crosslinking process, the polymer may be attached to the boron of boronate groups (e.g., boronate pinacolester groups), followed by reaction with a hydroxy-containing crosslinker, such as ethylene glycol, diethylene glycol, triethylene glycol, or a polyethylene glycol. Since crosslinking of the boronate groups with the solid particles is also desired, less than the total number of boronate groups on the polymer should be engaged in crosslinking. Alternatively, the polymer may be a hydroxy-containing polymer (e.g., polyvinyl alcohol), which may be reacted with a diboronate crosslinker. The hydroxy-containing polymer may also be reacted with boronate-functionalized solid particles, before or after crosslinking the polymer (or without crosslinking the polymer). The polymer may be crosslinked before or after crosslinking with the solid particles. Alternatively, the polymer may be crosslinked between functional groups other than boronate groups. For example, the polymer may be functionalized with amine ($NH_2$) groups, which may be crosslinked by any of the amine-reactive crosslinkers known in the art (e.g., a di-carboxy, di-aldehyde, or di-alkylhalide crosslinker).

The solid particles (component (ii)), which may be a "first set of solid particles" if another set of solid particles is also present, are embedded within the polymer. That is, the polymer functions as a matrix in which the solid particles are dispersed throughout. The solid particles can have essentially any composition, including inorganic and organic compositions, provided that the solid particles remain solid at an elevated temperature of at least 100° C., 200° C., or higher and are preferably not soluble in water. In order to crosslink with the polymer, the solid particles should possess surface functional groups that can react with boronate ester groups (typically, hydroxy groups) or the solid particles should be capable of surface functionalization with boronate groups (to react with a polymer containing boronate-reactive groups, such as hydroxy groups). The solid particles may have any shape, including a spherical, fiber, plate, or polyhedron shape.

In one set of embodiments, the solid particles have an inorganic composition, such as a metal oxide or metal sulfide composition. As well known, particles having a metal oxide or metal sulfide composition typically include surface hydroxy or thiol groups, which, for purposes of the present invention, can be reacted with a boronate ester-functionalized polymer to crosslink the solid particles with the polymer. The term "metal", as used herein, can refer to any element selected from main group, alkali, alkaline earth, transition metal, and lanthanide elements. Thus, the metal oxide or metal sulfide may be a main group metal oxide or sulfide, alkali metal oxide or sulfide, alkaline earth metal oxide or sulfide, transition metal oxide or sulfide, or lanthanide metal oxide or sulfide. Some examples of main group metal oxide compositions include $SiO_2$ (i.e., silica, e.g., glass or ceramic), $B_2O_3$, $Al_2O_3$ (alumina), $Ga_2O_3$, $SnO$, $SnO_2$, $PbO$, $PbO_2$, $Sb_2O_3$, $Sb_2O_5$, and $Bi_2O_3$. Some examples of alkali metal oxides include $Li_2O$, $Na_2O$, $K_2O$, and $Rb_2O$. Some examples of alkaline earth metal oxide compositions include $BeO$, $MgO$, $CaO$, and $SrO$. Some examples of transition metal oxide compositions include $Sc_2O_3$, $TiO_2$ (titania), $Cr_2O_3$, $Fe_2O_3$, $Fe_3O_4$, $FeO$, $Co_2O_3$, $Ni_2O_3$, $CuO$, $Cu_2O$, $ZnO$, $Y_2O_3$ (yttria), $ZrO_2$ (zirconia), $NbO_2$, $Nb_2O_5$, $RuO_2$, $PdO$, $Ag_2O$, $CdO$, $HfO_2$, $Ta_2O_5$, $WO_2$, and $PtO_2$. Some examples of lanthanide metal oxide compositions include $La_2O_3$, $Ce_2O_3$, and $CeO_2$. In some embodiments, mixed metal oxides (mixed composition of any of the above-mentioned metal oxides) are hierarchically assembled. In some embodiments, any one or more classes or specific types of the foregoing metal oxides (or all metal oxides) are excluded from the hierarchical assembly. Analogous metal sulfide compositions can be derived by substitution of oxide (O) with sulfide (S) in any of the exemplary metal oxide compositions recited above (e.g., $SiS_2$, $Li_2S$, or $CaS$). In some embodiments, any one or more of the above described inorganic compositions are excluded.

In another set of embodiments, the solid particles have an organic composition. The organic composition may be, for example, a natural or synthetic polymer. Some examples of natural polymers (biopolymers) include cellulose (e.g., cellulose fiber), hemicellulose, chitin, and chitosan. Some examples of synthetic polymers include polyvinylalcohol (PVA), polyvinylacetate, polyvinypyrrolidinone, polyacrylamide, polyethylene (PE), polypropylene (PP), polystyrene (PS), polysiloxanes, polyamides, polyesters (e.g., PLA and/or PGA), and copolymers thereof. The organic composition may also be elemental carbon. Particles containing or composed of elemental carbon include carbon nanotubes (e.g., single-, double-, or multi-wall), buckminsterfullerene, carbon black, and carbon fiber. Particles composed of an organic composition that is generally unfunctionalized (e.g., PE, PP, PS, or elemental carbon) need to be modified with some level of functionalization that can permit the particle to engage in bonding with boronate linkages, e.g., hydroxy-functionalized PE, PP, or PS. In some embodiments, any one or more of the above described organic compositions are excluded.

The particles can have any suitable size, typically up to or less than 100 microns. In different embodiments, the solid particles have an average size or substantially uniform size of precisely or about, for example, 0.001, 0.005, 0.01, 0.05, 0.1, 0.2, 0.3, 0.4 0.5, 0.6, 0.7, 0.8, 1, 2, 5, 10, 20, 50, or 100 microns, or an average size or substantially uniform size within a range bounded by any two of the foregoing values, e.g., 0.001-100 microns (wherein 0.001 microns=1 nm), 0.01-100 microns, 0.01-10 microns, 1-100 nm, or 1-100 microns, wherein the term "about" generally indicates no more than ±10%, ±5%, or ±1% from an indicated value. In some embodiments, at least 80%, 85%, 90%, 95%, 98%, or 99% of the particles have a size within any range bounded by any two of the exemplary values provided above. For example, at least 90% of the particles may have a size within a range of 0.005-10 microns, 0.01-10 microns, 0.1-10 microns, 0.005-1 microns, 0.01-1 microns, 0.1-1 microns, 0.005-0.1 microns, 0.005-0.05 microns, or at least or more than 95% of the particles may have a size within a range of 0.1-20 microns, 0.005-10 microns, 0.005-0.1 microns, 0.005-0.05 microns, 0.01-10 microns, 0.1-5 microns, 0.1-1 microns, 1-100 microns, or 1-100 nm. In some embodiments, 100% of the particles have a size with a desired size range. For particles in which the three dimensions are not the same (e.g., plate or fiber), the particle size may refer to the longest dimension. Any of the solid particles described above, which may have any of the inorganic or organic compositions described above, may have any of the particle shapes and sizes or sub-ranges thereof, as described above.

The solid particles are typically present in an amount of at least 0.1 wt % of the adhesive composition. In different embodiments, the solid particles are present in an amount of precisely or about, for example, 0.1, 0.2, 0.5, 1, 2, 3, 4, 5, 10, 15, 20, 25, 30, or 40 wt %, or an amount within a range bounded by any two of the foregoing values (e.g., 0.1-40 wt %, 0.1-30 wt %, 0.1-20 wt %, 0.1-10 wt %, 0.1-5 wt %, 1-40 wt %, 1-30 wt %, 1-20 wt %, 1-10 wt %, or 1-5 wt %). Any of the solid particles described above, which may have any of the inorganic or organic compositions described above, may be present in the adhesive composition in any of the amounts provided above, or sub-ranges therein, and may, in addition, have any of the particle shapes and sizes or sub-ranges thereof, as also described above.

The multiplicity of boronate linkages (component (iii)) crosslink between the polymer and solid particles, wherein the boronate linkages have the formula

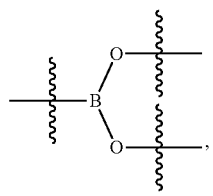 [SMILES: *OB(*)O*]

In some embodiments, the polymer is bound, directly or indirectly (via a crosslinker), to the boron atom of the boronate linkage, while the solid particles are bound, directly or indirectly (via a crosslinker), to oxygen atoms of the boronate linkage. In other embodiments, the polymer is bound, directly or indirectly (via a crosslinker), to oxygen atoms of the boronate linkage, while the solid particles are bound, directly or indirectly (via a crosslinker), to the boron atom of the boronate linkage. In the adhesive composition, one or two additional polymers (i.e., second or third polymers) may be included in the adhesive composition, wherein the additional polymer(s) may not engage in crosslinking, or may engage in crosslinking (e.g., by boronate linkages) with the first polymer and/or the solid particles. In the adhesive composition, one or two additional crosslinkers (i.e., other than the boronate linkages or bound to the boronate linkages) may be present and may function to crosslink the polymer or additional polymer or may function to crosslink between the polymer and one or more additional polymers.

In another aspect, the present disclosure is directed to a method of producing the adhesive composition described above. First, a boronated polymer may be produced by reaction with bis(pinacolato)diboron ($B_2Pin_2$) by known methods. In a typical process, the boronated polymer in solution is mixed with hydroxy-containing particles to form a homogeneous mixture, which may be applied on a surface to bond the surface with another surface. Alternatively, a hydroxy-containing polymer may be mixed with boronated particles, such as particles made from a vinyl-addition polymer containing 4-vinylboronic acid, to form the adhesive composition. The solvents may be removed to provide a solid adhesive that can be applied onto a surface in solid form.

In another aspect, the present disclosure is directed to a method of bonding first and second surfaces together by use of any of the above-described adhesive compositions. In the method, a crosslinked adhesive composition is applied (e.g., as solution adhesive or dry adhesive) onto the first surface followed by pressing the second surface onto the crosslinked adhesive composition on the first surface. The pressing may be at room temperature or an elevated temperature (hot pressing), typically using a temperature of at least or above 100, 150, or 200° C. The surfaces being bonded preferably contain some level of hydroxy functionalization to permit dynamic (fluxional) covalent bonding between the hydroxy groups on the surface and boronate oxygen groups in the adhesive composition. In the bonding process, boronate oxygen atoms bound to the solid particles or the polymer may engage in fluxional covalent bonding with hydroxy groups on the surface. One or both of the first and second surfaces may be a metal surface, glass surface, or ceramic surface. The metal surface may be, for example, aluminum, steel, or copper, or an alloy thereof. The ceramic surface may have any of the metal oxide compositions in the art, other than glass. The surface may also be a plastic or polymer. In a situation where the surface does not contain or contains lower than a desired concentration of hydroxy groups, the surface may first undergo an oxygenating pretreatment, such as oxygen plasma or chemical pre-treatment or etch. The adhesive composition may exhibit an exceptionally strong adhesion, e.g., at least or above 5, 6, 7, 8, 9, or 10 MPa. The adhesive composition may also exhibit an exceptionally high work of debonding, e.g., at least or above 500, 600, 700, or 800 N/m. By virtue of the dynamic covalent bonding ability of the adhesive composition, the bonded surfaces may, in a successive step, be thermally debonded. After being debonded, the surfaces may be subsequently rebonded, or the debonded adhesive composition may be removed from the surfaces and re-used for bonding other surfaces.

Examples have been set forth below for the purpose of illustration and to describe certain specific embodiments of the invention. However, the scope of this invention is not to be in any way limited by the examples set forth herein.

EXAMPLES

Overview

In the following experiments, a dynamic covalent functionality of boronic ester was added to a commodity triblock thermoplastic elastomer, polystyrene-b-poly(ethylene-cobutylene)-b-polystyrene (SEBS), which permits dynamic covalent linkage with unmodified silicon nanoparticles (SiNPs). Boronic ester groups in triblock copolymer reacts with hydroxyl groups SiNPs to yield dynamically crosslinked (reinforced) nanocomposites. This dynamic covalent bond allows these crosslinked composite materials to reprocess for multiple times while maintaining their mechanical robustness. The dynamic boronic ester groups on SEBS may also form covalent bonds with various oxide interfaces on substrates for adhesion. Furthermore, the soft ethylene butylene (EB) block in SEBS dissipates mechanical force and the crosslinked nanocomposite structure provides mechanical robustness, while the boronic ester dynamic bonds provide the covalent bonding and rebonding ability with various substrates and SiNPs.

The dynamic boronic ester functionalization coupled with SEBS structure with SiNP fillers results in a remarkably strong and tough adhesive (e.g., green curve in FIG. 1), revealing a straight-forward approach for the preparation of load-bearing tough adhesives. This versatile adhesive can be used in both dry and solution states and can be applied to various surfaces. The findings in this study provide insights on another usage of dynamic polymers and will unwrap many opportunities by providing exceptionally tough adhesives for many applications, including for the automotive, aerospace, and construction industries.

The dynamic covalent crosslinking between hydroxy groups on SiNPs and boronic ester groups on SEBS provides an exceptional level of reprocessability, mechanical robustness, and rebondable ability. A 20 wt % SiNPs loaded composite exhibits very strong adhesion at 9.38±1.39 MPa and work of debonding of 733.96±71.58 $Nm^{-1}$ on an aluminum substrate, which exceeds many existing commercial adhesives. Moreover, while most structural adhesives are permanently crosslinked single-use adhesives, the presently described adhesives exhibit reprocessability due to the presence of dynamic bonds, which permits bonding and rebonding on various surfaces. In addition, the SEBS boronic ester-based adhesives described herein broaden the service window of SEBS about 100° C., from −30-100° C. to −30-200° C., which is important for many applications with a required wide operation temperature range.

Synthesis of Boronated SEBS (S-Bpin)

S-Bpin was synthesized by following a literature procedure (A. D. Mohanty et al., Macromolecules, 48, 7085-7095, 2015). In brief, SEBS (5.00 g, 14.24 mmol of styrene units), $B_2Pin_2$ (12.65 g, 49.8 mmol, 3.5 equiv), [IrCl(COD)]2 (0.502 g, 1.5 mol % based on the amount of $B_2Pin_2$), dtbpy (0.401 g, 3 mol % based on the amount of $B_2Pin_2$), anhydrous THF (50 mL), and a magnetic stirring bar were placed into a 100 mL flame dried round-bottom flask and purged with argon for 30 mins. The reaction flask was sealed under an argon atmosphere and placed in the preheated oil bath at 75° C. The reaction was stopped after 24 hours and cooled to room temperature. The solution was diluted with chloroform (25 mL) and precipitated into methanol, and the resulting white color polymer was collected to dry under vacuum at room temperature. The dissolution and precipitation methods were repeated two more times for the complete removal of catalysts and other unreacted small molecules. The degree of functionalization of styrene units was calculated from $^1H$ NMR based on the relative intensity of the methyl group in the 1, 2-butylene unit of the polymer main chain (at 0.78-0.88 ppm) with respect to the increased integral ratio of the overlapping SEBS-methylene and boronated ester methyl resonance (at 0.9-1.5 ppm).

Synthesis of SiNPs S-Bpin Composites and Their Crosslinked Films

S-Bpin (1.0 g) was dissolved into anhydrous THF (12 mL) in an oven-dried vial equipped with a stir bar. The solution was filtered using a 0.45 μm pore size filter to remove undissolved material. A solution of silica nanoparticles in methyl isobutyl ketone (MIBK) solvent was added into the S-Bpin solution with continuous stirring. After 1 hour of stirring at room temperature, the solvents were dried under vacuum to give the crosslinked composite as a rigid solid. The composite product was further dried at 120° C. under vacuum overnight to remove residual solvent. This partially cured composite was hot-pressed at 215° C. for 3 hours with constant pressure to make the fully cured composite film after slow cooling.

Synthesis of Composite Containing Borylated Polystyrene and SiNPs

Borylated polystyrene was synthesized by following the same procedure of the synthesis of S-Bpin. $^1H$ NMR demonstrated the borylated polystyrene product formation. The nanocomposite was also prepared from borylated polystyrene and SiNPs following the above-mentioned procedure.

Solvent Resistance Study

A solvent resistance analysis of the SiNPs S-Bpin composites was performed. Fully crosslinked composite films (15 mg) were subjected to different solvents (1 mL), such as tetrahydrofuran (THF), dichloromethane (DCM), chloroform ($CDCl_3$), dimethylformamide (DMF), and deionized water for seven days, and their solubility was monitored at room temperature. After seven days of immersion under solvent, the composite films underwent some degree of swelling in THF, DCM, and $CDCl_3$, but did not dissolve completely. Notably, these composite films were found to be very stable underwater and DMF as they absorbed a negligible amount of water after seven days. The water stability was further confirmed by TGA and FTIR, which revealed that they did not change their chemical compositions.

Lap Shear Adhesion

Lap shear adhesion measurements for Al and steel were conducted following a modified version of ASTM D1002 method (ASTM D 1002-10) in a MTS Alliance RT/5 tensile frame equipped with a 5 kN load cell at 2 mm $min^{-1}$ crosshead speed rate. For solution adhesive, SiNPs S-Bpins composite solution (200 μL) was spread onto the substrates using a syringe and dried for 1 min at RT. The adherents were overlapped (12 mm×12 mm) in a single lap shear configuration. The lap shear specimens were cured at 120° C. overnight under a high vacuum and fully cured by hot pressing at 215° C. for 2 h under constant pressure (— 0.096 MPa). The samples were cooled down to room temperature before performing the test. For dry adhesive (melt adhesive), fully cured SiNPs S-Bpins composite film was cut into small pieces with an area of (3 mm×3 mm) 9 mm$^2$, or (6 mm×6 mm) 36 mm$^2$ and placed between two overlapping substrates. These overlapping substrates were placed on hot press at 215° C. and press for 2 hours under constant pressure. After cooling at room temperature, the lap shear strength was measured and the average results of five specimens were reported with error bars of standard deviation. The commercial adhesives samples were prepared following the manufacturer's instructions. The adhesive performance at elevated temperature was conducted on Al and steel at 95° C. The lap shear specimen was heated under a high temperature-controlled system and underwent the lap shear test when the temperature was stabilized at 95° C. For glass substrates, the lap shear adhesion measurements were performed in a MTS Alliance RT/5 tensile frame equipped with a 2 kN load cell at 2 mm min$^{-1}$ crosshead speed rate. Following a similar procedure, the lap shear adhesion test was performed for the glass substrates.

Lap shear adhesion is defined as the maximum force (in N) of the adhesive joint obtained from the lap shear test divided by the overlap area (in mm$^2$) of adhesives, as provided by the following formula:

$$\text{Lap shear strength} = \frac{\text{Force }(N)}{\text{Adhesive Area}(\text{mm}^2)}$$

Work of debonding is defined as the integrated area under the force-versus-extension curve. The integration was achieved using commercial software.

Density Functional Theory (DFT) Calculations

DFT calculations were utilized to explore boron ester binding on silica, alumina, and iron oxide hydroxylated surfaces as these are appropriate models for understanding the chemical interactions with Si—O—H, Al—O—H, and Fe—O—H groups when chemical bonding is the primary energy of contribution.

Synthesis of Multi-phase Material Incorporating Interfacial Dynamic Bonding

Figure 2A:
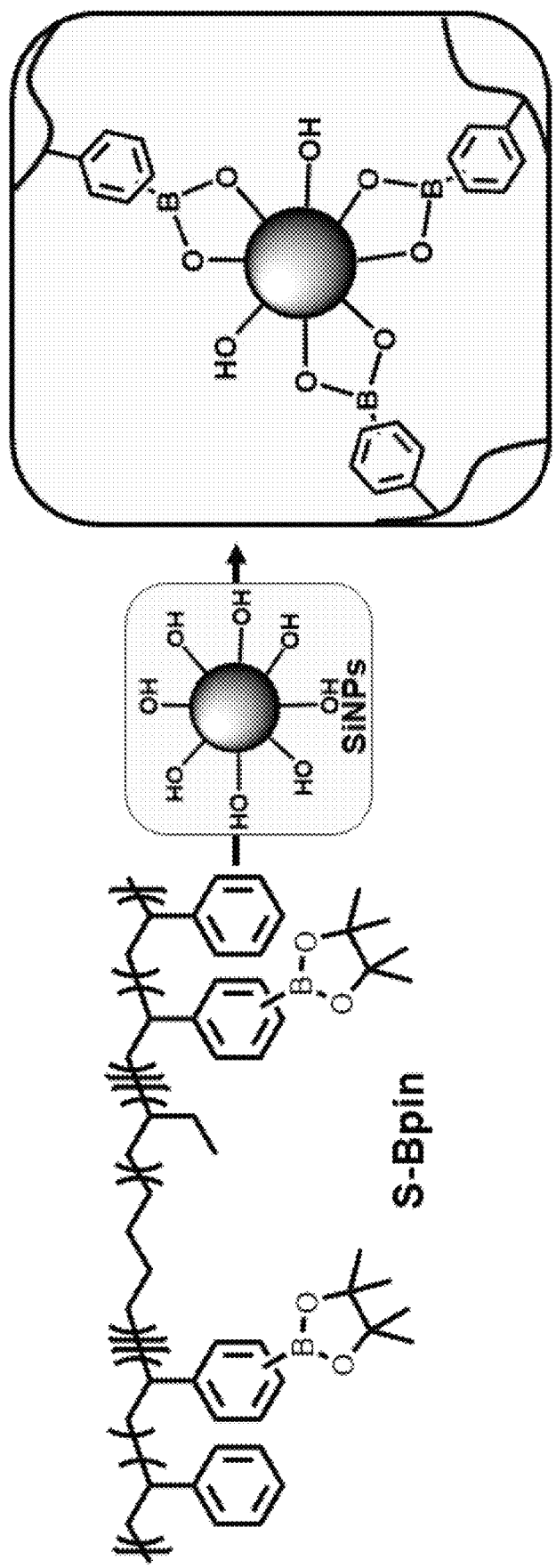
FIGS. 2A-2D. The design of a tough adhesive from commodity polymer.

SEBS triblock copolymer (118 kg/mol) with 30 mol % styrene was modified via aromatic C—H borylation to incorporate dynamic boronic ester functional groups to yield a borylated SEBS triblock copolymer (S-Bpin) (FIG. 2A). The successful S-Bpin conversion was evidenced in the $^1$H NMR and Fourier-transform infrared spectroscopy (FTIR) spectra. The aromatic C—H protons of styrene in the $^1$H NMR spectrum splits into three broad peaks at the 6.0-7.8 ppm region, indicating successful functionalization on the aromatics, while pinacol boronate ester (Bpin) methyl protons were overlapped with the SEBS backbone methylene peak. The degree of aromatic ring functionalization was calculated from the $^1$H NMR spectrum of S-Bpin and SEBS based on the relative intensity of the methyl group in 1,2-butylene unit of the polymer chain (at 0.78-0.88 ppm) with respect to the increased integral ratio of the overlapping SEBS-methylene and Bpin methyl resonance (at 0.9-1.5 ppm). $^1$H NMR spectrum indicates that a total of 95 mol % of aromatic rings on the styrene block are functionalized by Bpin. The presence of clear signals at 1350 cm$^{-1}$ and 1123 cm$^{-1}$ for asymmetric and symmetric stretching of the B—O bond in the FTIR spectrum further confirmed the successful borylation. Similarly, the polystyrene homopolymer was also modified via aromatic C—H borylation to elucidate the impact of triblock architecture on the adhesive properties.

Figure 2B:
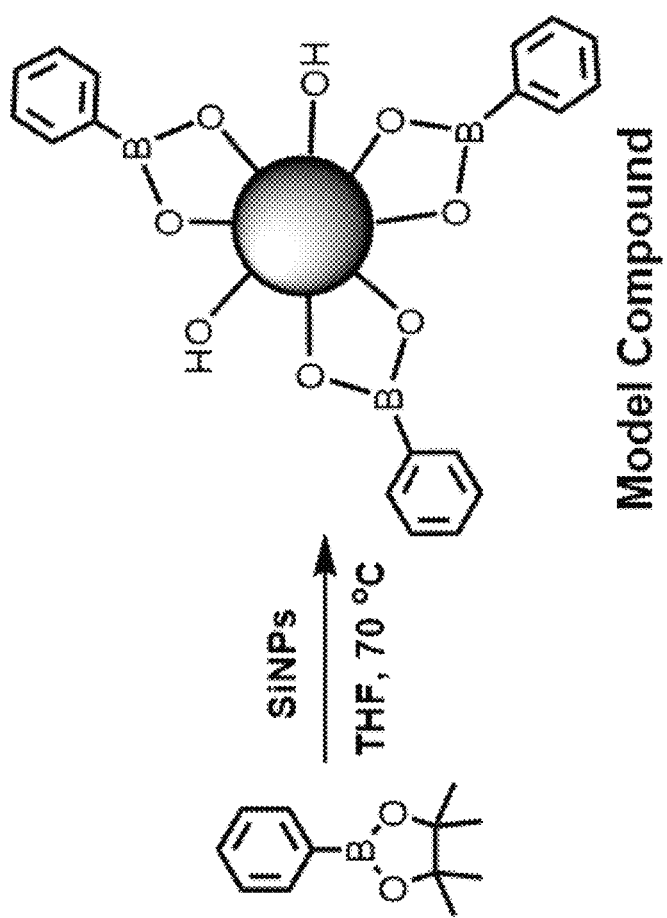

The biomimetic multi-phase composites of S-Bpin with SiNPs (denoted as SiNPs S-Bpin composites) were prepared with varying amounts of SiNPs (size ~14 nm) and S-Bpin, where SiNPs acted as a dynamic crosslinker (FIG. 2A). The tetrahydrofuran (THF) solution of S-Bpin and different weight percent (wt %) of SiNPs were mixed at room temperature and dried under reduced pressure at 120° C. to obtain partially crosslinked networks. Fully cured SiNPs S-Bpin composites films were subsequently prepared by hot pressing at 215° C. for 3 h under ~0.38 MPa pressure. The crosslinking reaction (chemical reaction) between hydroxyl groups on SiNPs and boron pinacol ester groups of S-Bpin was confirmed by FTIR spectrum where a broad signal appeared at 1114 cm$^{-1}$ corresponding to the Si—O bond overlapped with a B—O bond. The obtained clear S-Bpin solution in THF with SiNPs loading of 5-20 wt % indicates good miscibility of SiNPs and S-Bpin polymer. In contrast, SiNPs added to the SEBS solution in THF at any loading exhibited a cloudy solution. Due to the interaction between SiNPs and polymer matrix, up to 20 wt % SiNPs loading maintained high dispersibility. The high dispersion of SiNPs is also confirmed by the transmission electron microscopy (TEM) images. The SiNPs S-Bpin composite solution with SiNPs loading above 20 wt % formed a cloudy solution, which indicates SiNPs aggregation or macro phase separation between excess silica and polymer matrix. The microphase separation was maintained for the crosslinked SiNPs S-Bpin composites, evidenced by the presence of a strong primary scattering peak (d-spacing ~30 nm) in the SAXS profile of 10 wt % SiNPs S-Bpin. To confirm the reaction between SiNPs and the boronic ester group of S-Bpin polymer, one small molecular model compound was synthesized from phenylboronic acid pinacol ester and SiNPs following a conventional silica modification reaction condition (T. Zhu et al., ACS Macro Lett., 9, 1255-1260, 2020). Phenylboronic acid pinacol ester was treated with SiNPs in THF at 70° C. to form SiNPs modified with phenylboronic acid, as shown in FIG. 2B. The $^1$H NMR spectrum shows the disappearance of the peak at 1.3 ppm for four methyl groups in pinacol from the phenylboronic acid pinacol ester, indicating successful conversion. The weight gain on the SiNPs surface in the TGA curve also confirmed the boronic ester transesterification reaction.

Figure 2C:
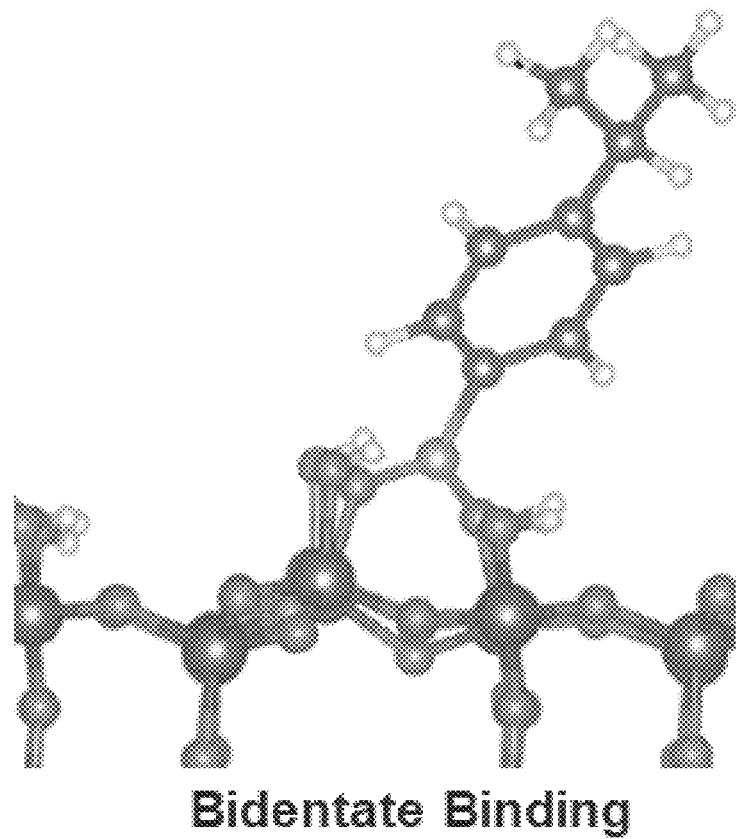
Figure 2D:
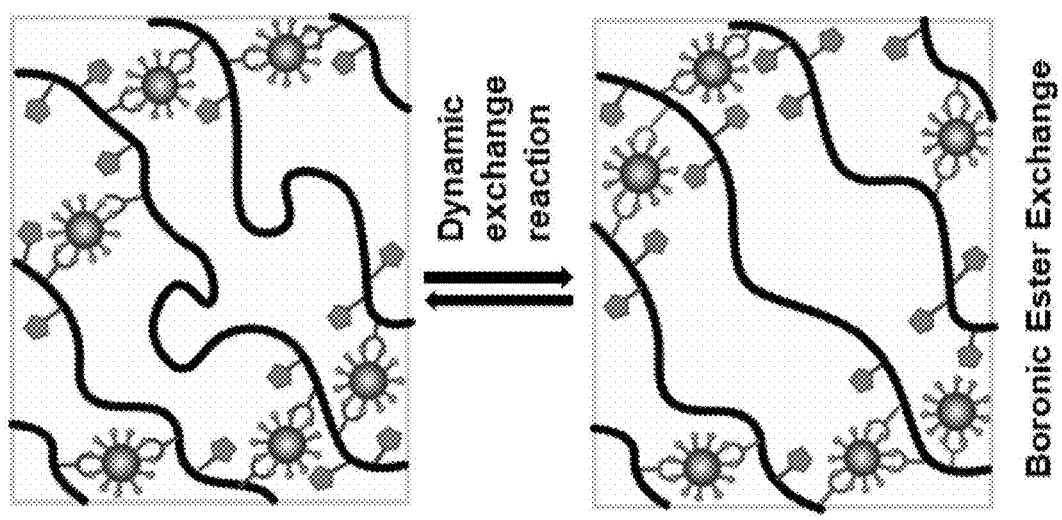

To further understand the feasibility and energetics of the reaction between hydroxyl groups on SiNPs and the boronic ester groups on S-Bpin, DFT calculations were performed. DFT calculations indicate that covalent bonding can occur between the boron ester moieties and the hydroxyl groups on the silica surface either via a mono-dentate fashion or a bi-dentate fashion (FIG. 2C). During this binding, one or more Si—O—H moieties are converted to Si—O—B, where the mono-dentate bindings are lower energy states than the bi-dentate bindings. The mono-dentate binding energy of boron ester with silica termination was estimated to be ~70 kJ/mol. The binding energy is significantly higher than typical secondary interactions, such as hydrogen bonding (4-13 kJ/mol), but lower than the covalent C—C bond (~356 kJ/mol) (J. M. Berg et al., Biochemistry, W. H. Freeman, N Y, 2002). The high binding energy of boron ester with silica surfaces suggests that S-Bpin crosslinking by SiNPs can behave similarly to covalently crosslinked composite network, with the capability of this B—O bond exchange with neighboring hydroxyl groups on SiNPs, that enables the reprocessability (FIG. 2D).

The crosslinking nature of SiNPs S-Bpin composites was demonstrated via a solvent resistance study. In brief, composite films were subjected to different solvents, such as dichloromethane (DCM), chloroform (CHCl$_3$), THF, dimethylformamide (DMF), and DI water, for seven days at room temperature, and the solubility was monitored. The crosslinked samples of SiNPs S-Bpin composites were not dissolved in any solvents, although some degree of swelling was observed in DCM, CHCl$_3$, and THF. In contrast, uncrosslinked S-Bpin readily dissolved in THF within a few minutes. It should be noted that the S-Bpin also exhibited high hydrolytic stability as it absorbed negligible water around 2.2 wt % after 7 days of immersion in water. There is no significant change observed in the thermogravimetric analysis (TGA) curve and FTIR spectrum that confirmed the stability of boronic ester bonds with the presence of water due to the embedded nature of boronic ester groups by local hydrophobic polymer chains, which has also been observed by others (O. R. Cromwell et al., *J. Am. Chem. Soc.*, 137, 6492-6495, 2015).

Mechanical Properties of Dynamic Crosslinked Multi-phase Composites

Figure 3A:
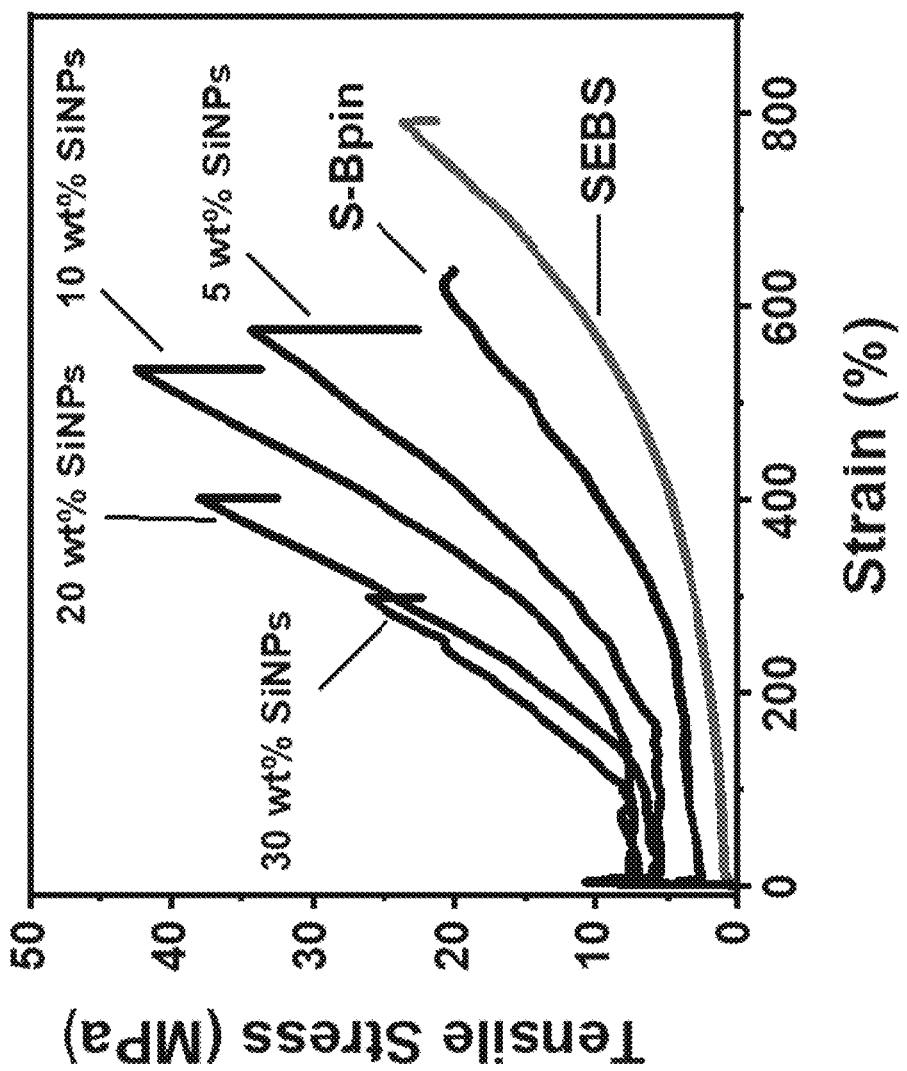
FIGS. 3A-3F. Mechanical properties of SEBS, S-Bpin, and different SiNPs S-Bpin composites.
Figure 3B:
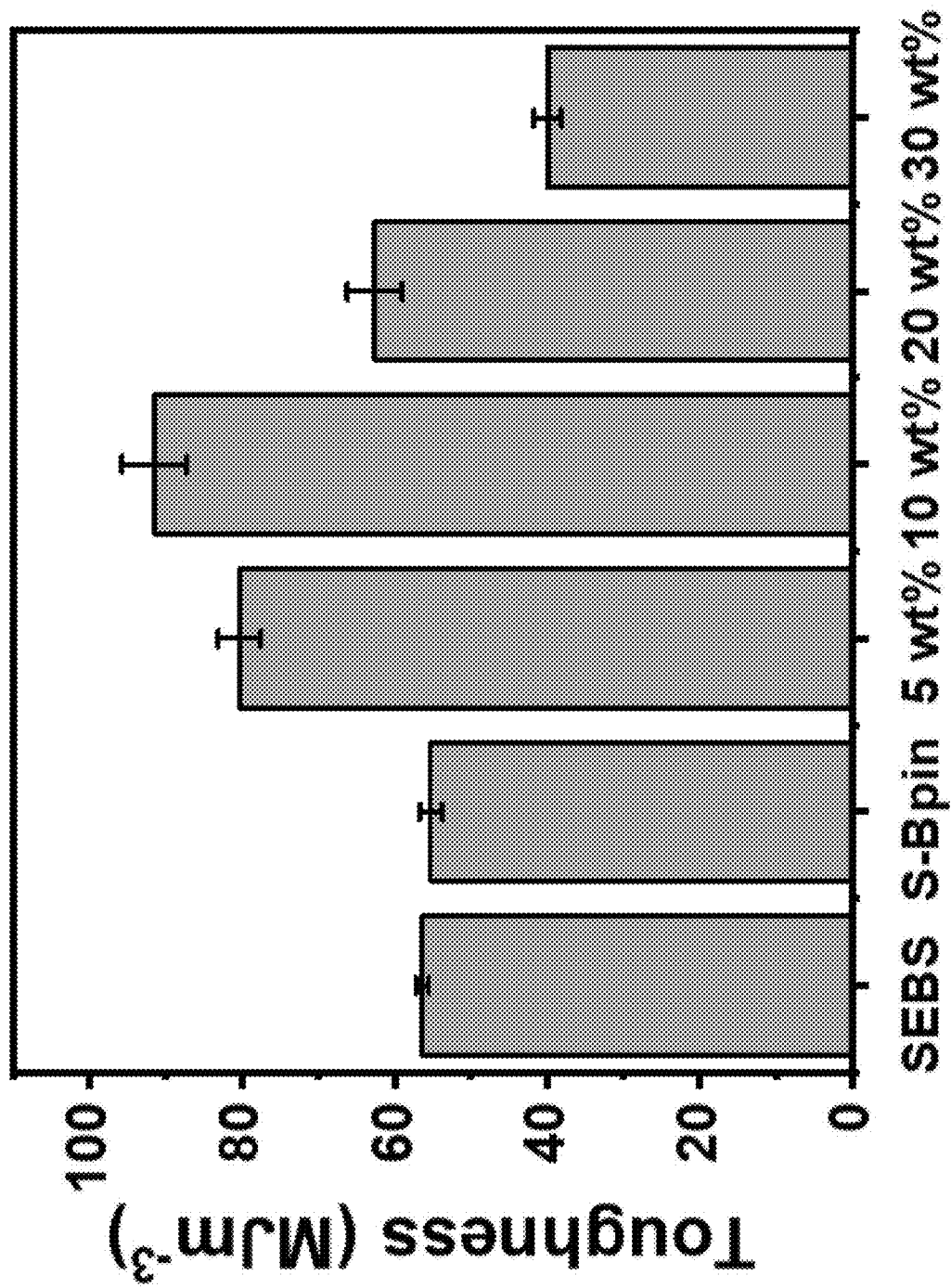

The mechanical properties of SEBS were significantly improved after modification and subsequent crosslinking by SiNPs, as observed in the stress-strain curves (FIG. 3A). The presence of a clear yield point in tensile stress-strain curves of SiNPs S-Bpin nanocomposites indicates the elastic to plastic transition with subsequent strain hardening. Compared to SEBS copolymers, the crosslinked nanocomposites exhibited significantly higher tensile strength and young's modulus with slightly decreased elongation at break. The SiNPs act not only as a reinforcer but also as dynamic covalent crosslinkers through B—O bond formation between the silicate surfaces and polymer matrix. The higher loading of SiNPs increases the crosslink density that enhances the mechanical strength, while the restriction to the polymer chain mobility results in the decrease of elongation at break. The tensile strength and toughness of 10 wt % SiNPs S-Bpin achieved 40 MPa and 91.5 MJm$^{-3}$, respectively, which are almost double those of SEBS (25 MPa and 56.5 MJm$^{-3}$). The tensile strength and toughness of 20 wt % SiNPs S-Bpin resulted in 32 MPa and 62.6 MJm$^{-3}$, whereas 30 wt % exhibited 26 MPa and 40.01 MJm$^{-3}$ (FIG. 3B). The mechanical properties decreased above 20 wt % SiNPs loading probably due to the aggregation of unreacted SiNPs. The Young's modulus also increased significantly with SiNPs loading. For example, Young's modulus of SEBS increased from 14.5 MPa to 368 MPa with 20 wt % SiNPs loaded composites.

Figure 3C:
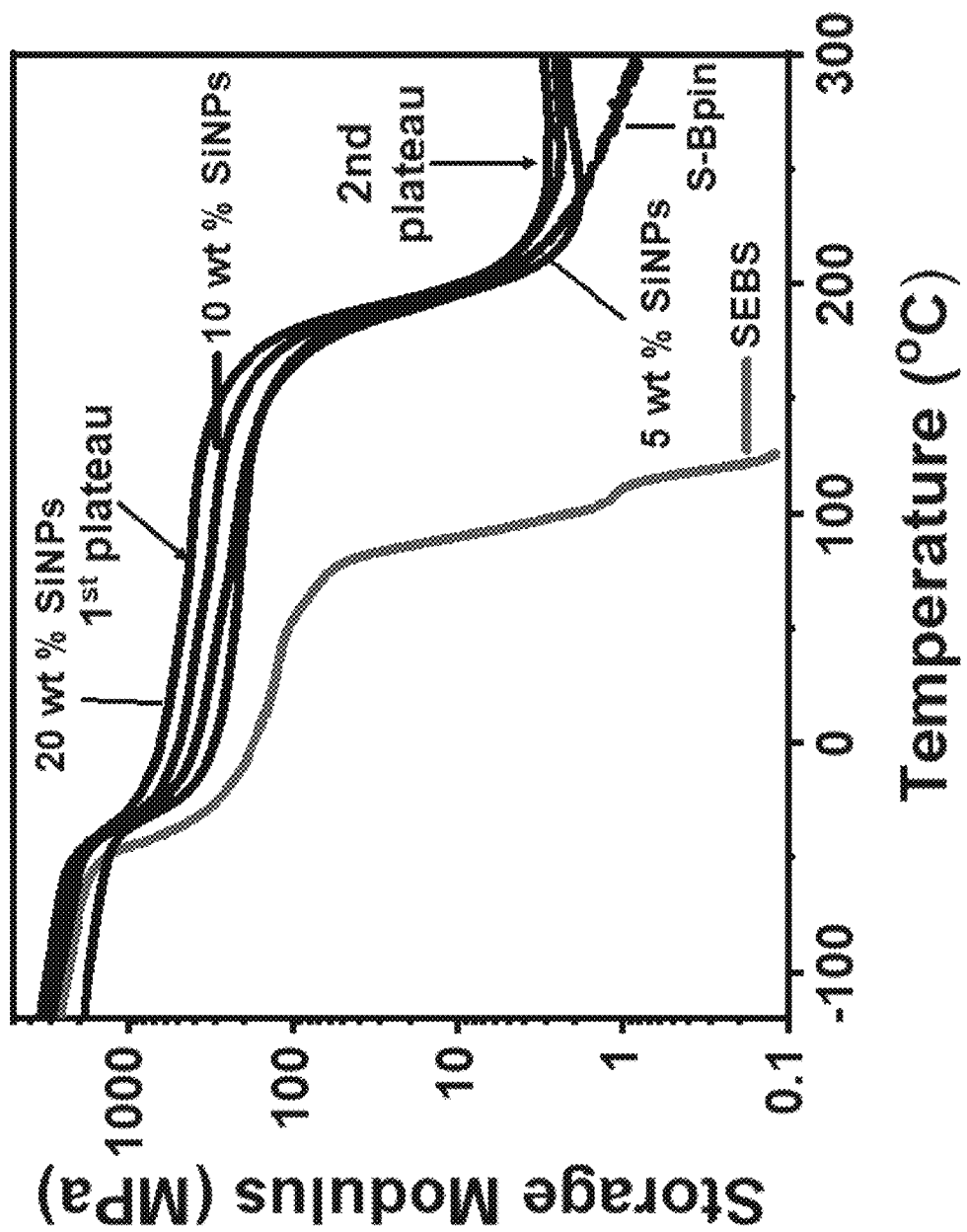

The boronic ester-based crosslinking significantly broadens the service window of SEBS, which is important for many applications with a required wide operation temperature range. The dynamic mechanical analysis (DMA) data (FIG. 3C) clearly indicate a significant shift in the glass transition temperature (T$_g$) of polystyrene block from ~90° C. in SEBS to ~200° C. in the modified SEBS, while the minimal change is observed in T$_g$ for EB block (from –40 to –30° C.). The T$_g$ of crosslinked SiNPs S-Bpin composites exhibits an additional slight increase with increasing SiNPs loading, probably due to the formation of higher crosslinked networks that retards polystyrene chain mobility. For example, the T$_g$ of the polystyrene block in the 20 wt % SiNPs loaded composite is 211° C. compared to T$_g$ of ~204° C. for the 5 wt % SiNPs S-Bpin. At the rubbery plateau range of –30-200° C., the storage modulus also increases with SiNPs loading. As shown in FIG. 3C, the 20 wt % SiNP S-Bpins composite shows higher storage modulus (553 MPa) than SEBS (126 MPa) and S-Bpin (221 MPa) at room temperature. The DMA curves for SiNPs S-Bpin samples (FIG. 3C) also show the second plateau region after the second T$_g$, indicating the formation of strong dynamic covalent crosslinking between silica and polymer matrix.

Figure 3D:
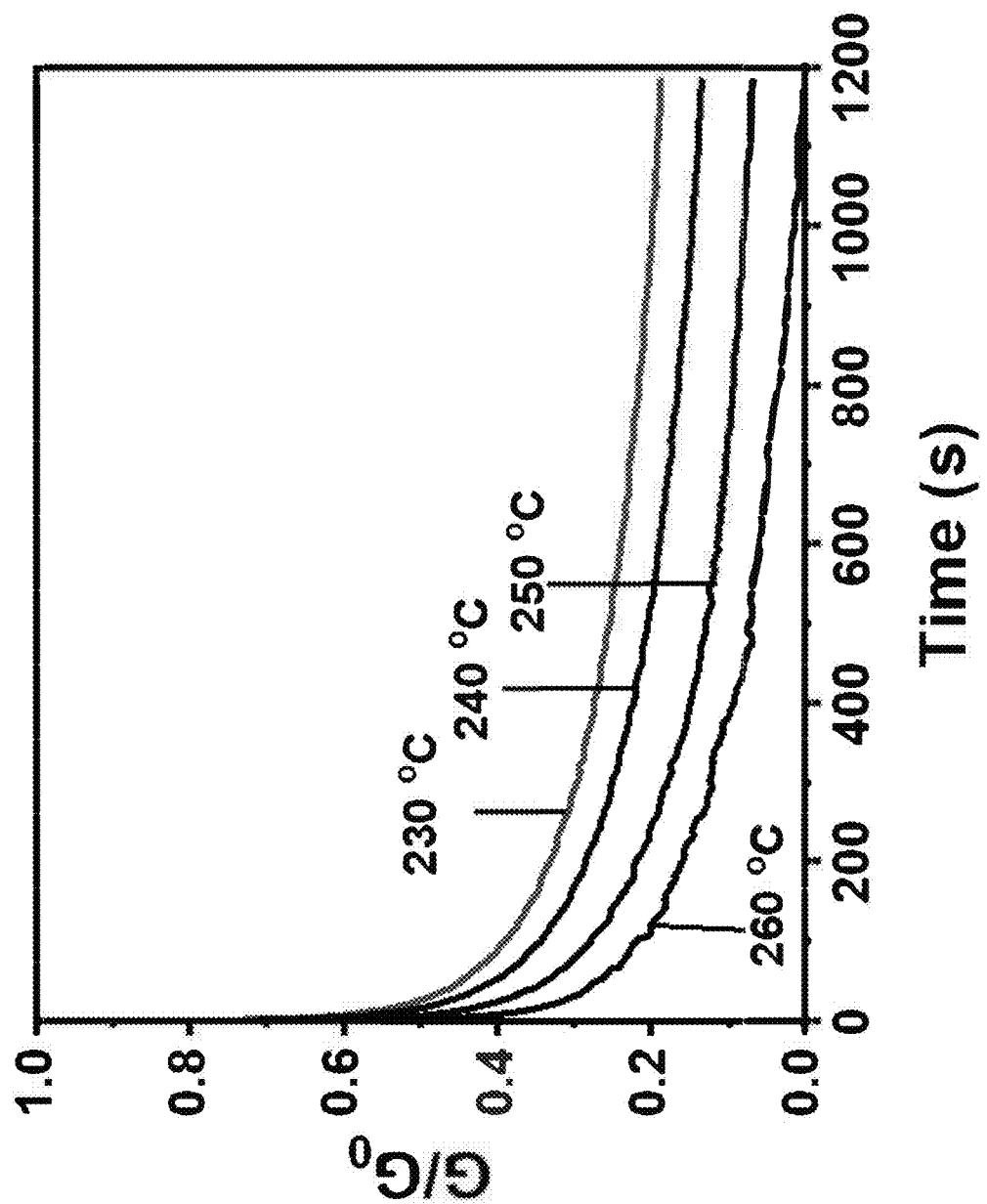

The dynamic behavior of boronic ester exchange in crosslinked 10 wt % SiNPs S-Bpin (FIG. 3D) and 20 wt % SiNPs S-Bpin composites was demonstrated in the stress relaxation experiment by monitoring stress decay at elevated temperature (230-260° C.) over time at a constant strain of 2%. The crosslinked SiNPs S-Bpin composites show substantial stress decay with time, and their stress relaxation rate increased with the temperature above T$_g$ (FIG. 3D), because the boronic ester transesterification dynamic exchange is accelerated at a higher temperature (Y. Chen et al., *ACS Appl. Mater. Interfaces*, 10, 24224-24231, 2018). The composites with lower SiNPs exhibited much faster relaxation when compared with higher SiNPs loaded samples, since the higher SiNPs content increases the crosslink density, and retards the topology rearrangement (Z. Wang et al., *Macromolecules*, 53, 956-964, 2020). The characteristic relaxation times (τ) of 10 wt % and 20 wt % SiNPs S-Bpin were determined at 1/e (37%) of the normalized relaxation modulus. The relaxation time (T) of 10 wt % SiNPs S-Bpin at 250° C. (35 s) is more than eight times faster than that of 20 wt % SiNPs S-Bpin (300 s), which suggests that the higher SiNPs form a higher degree of crosslinked network, which results in the restricted chain mobility and hindered bond reshuffling. The apparent activation energies (E$_a$) for stress relaxation of 10 wt % and 20 wt % SiNPs S-Bpin is in the range of 150-170 kJmol$^{-1}$, obtained from fitted curves of the relaxation time vs temperature plot. This apparent activation energy is relatively higher than those reported in previous studies (e.g., Y. Chen et al., Ibid.), which may be due to densely crosslinked microphase separated domain from high molecular weight block copolymer matrix, and restricted diffusion of reactive associative functional groups.

Figure 3E:
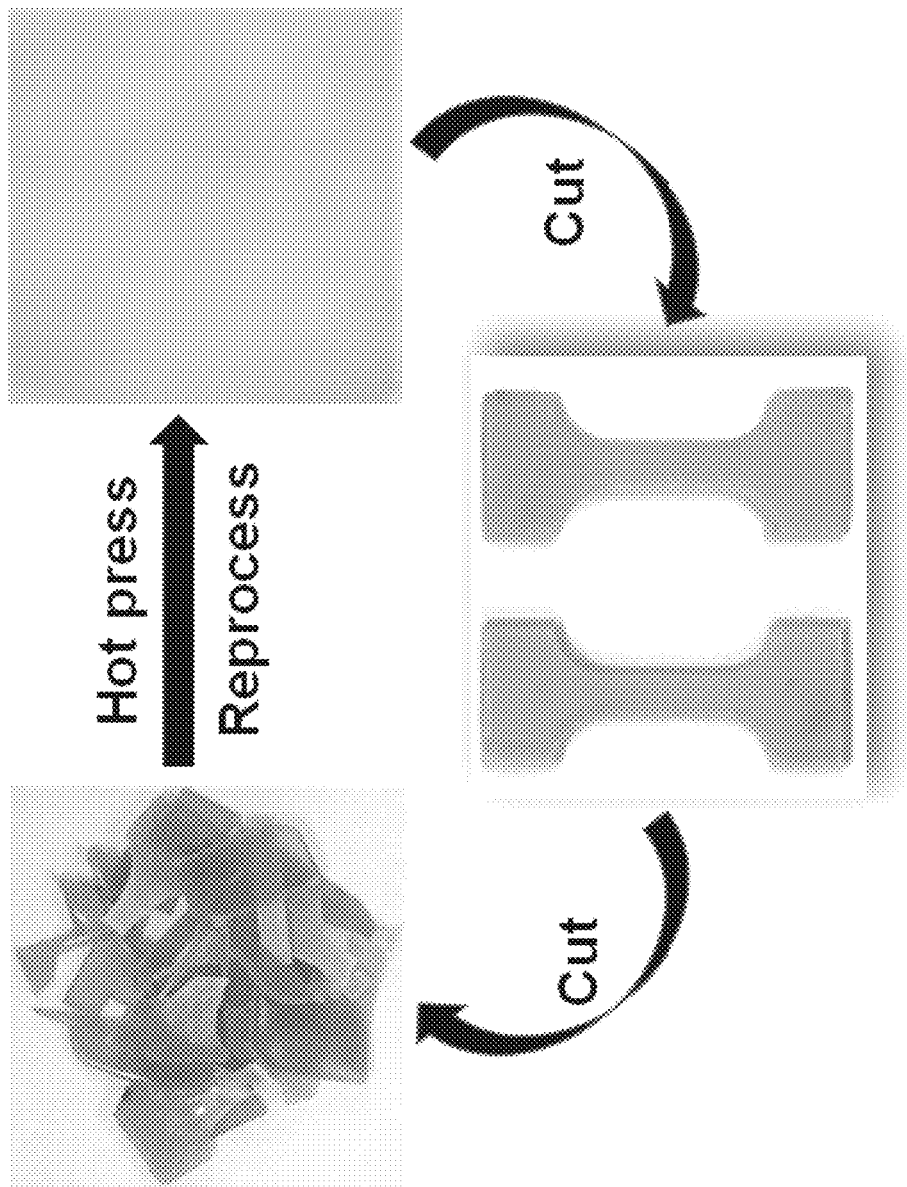
Figure 3F:
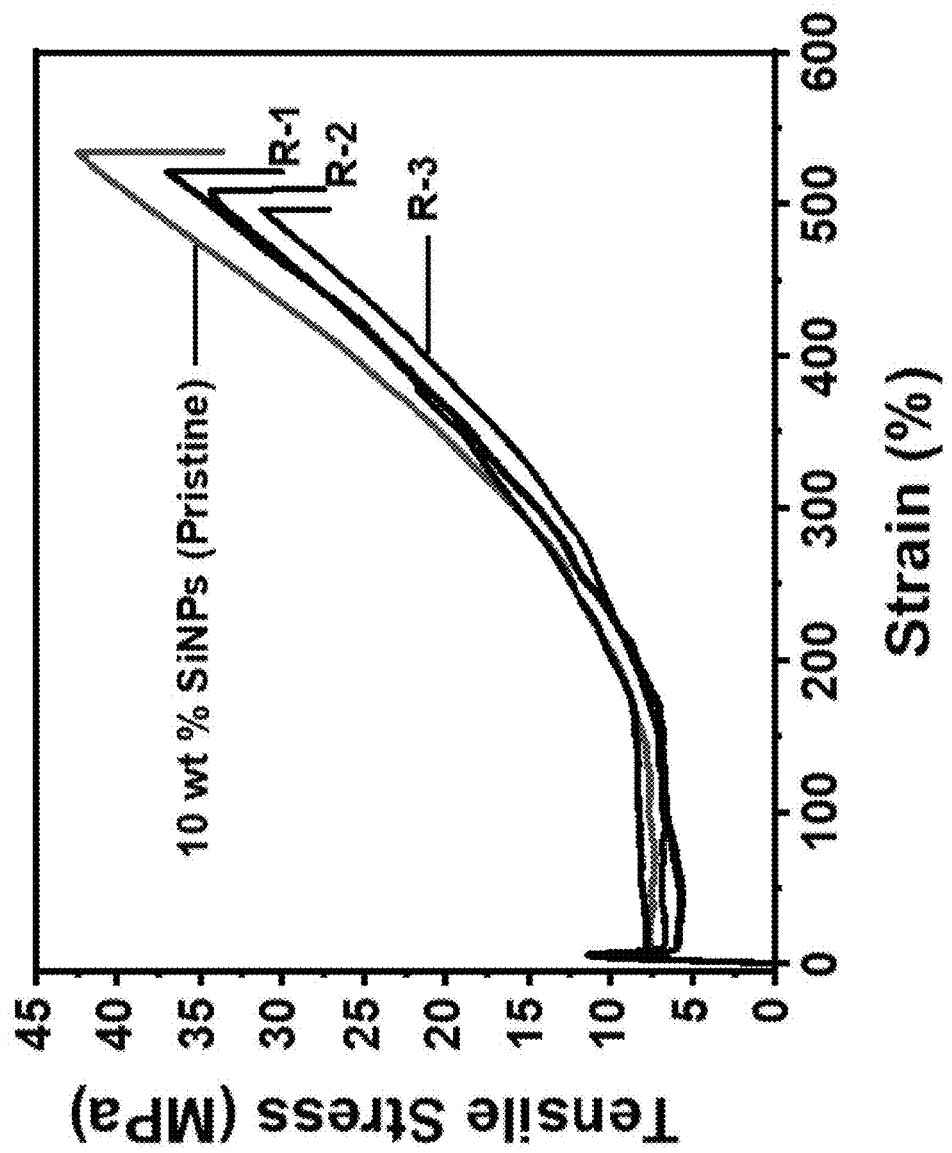

The boronic ester crosslinked nanocomposite samples can be easily reprocessed at a high temperature as the B—O bond can break and reform or by rearranging the network at above T$_g$. Since the T$_g$ of the polymer (outer block) is around 200-212° C., a high temperature above T$_g$ around 215° C. is required to allow polymer chain mobility and network adaptability for reprocessing. The composite film was cut into small pieces and reprocessed at 215° C. and 0.38 MPa pressure for 2 h, as shown in schematically in FIG. 3E. The efficacy of reprocessability was evaluated by measuring mechanical properties of reprocessed samples, including tensile stress and strain, as shown in (FIG. 3F). The reprocessed samples showed slightly diminished tensile strength and elongation at breaks after the third cycle, which may be due to the thermal oxidation as the samples were reprocessed at high temperatures in an open-air condition. The TGA curves showed their high stability against thermal degradation at elevated temperatures, and their chemical composition did not change significantly upon reprocessing as evidenced by the FTIR spectra. Performing three reprocessing cycles of the crosslinked nanocomposite samples corroborates the dynamic nature of the B—O bond exchange between the silicate surfaces and polymer matrix. These SiNPs S-Bpin composites can be used as reprocessable crosslinked polymeric materials and can serve as next-generation sustainable hybrid materials such as reusable adhesives and parts.

Tough Adhesive Behavior

As S-Bpin can form dynamic covalent bonds with hydroxyl groups on SiNPs, it was herein hypothesized that S-Bpin would show strong adhesion with hydroxyl-terminated surfaces. DFT calculations were utilized to explore covalent bonding between the boron ester moieties of S-Bpin and the hydroxyl-terminated aluminum, steel, and glass surfaces. In general, glass surfaces are terminated with Si—O—H groups, whereas aluminum and steel metal terminate in an oxidized layer of Al—O—H and Fe—O—H, respectively. DFT calculations indicate that covalent bonding can form with hydroxyl groups found on all of these surfaces either via a mono-dentate or bi-dentate fashion, wherein the bi-dentate states are less energetically favored and require higher temperatures to form the bi-dentate geometry. The mono-dentate bindings of S-Bpin with Si—O—H, Al—O—H, and Fe—O—H were calculated to have binding energies of 72 kJ/mol, 16 kJ/mol, and 17 kJ/mol. The ultimate binding may include a mixture of mono-dentate bindings and bi-dentate bindings, but could be dominated by either type of bonding. According to the DFT results, the S-Bpin polymer should show strong adhesive behavior with hydroxy-terminated surfaces, and the higher adhesion on the glass can be rationalized by either stronger binding energy or due to access to a larger number of hydroxyls. To investigate the adhesive property of S-Bpin experimentally, the lap shear adhesion test was performed on aluminum (Al) surfaces initially with an overlapped surface area of (12 mm×12 mm) 144 mm$^2$ following a modified version of ASTM D1002. S-Bpin exhibited a lap shear strength of 4 MPa, while the lap shear strength of SEBS on an Al substrate resulted in 2.5 MPa. SEBS is widely used as a hot-melt pressure-sensitive adhesive and the improved adhesion of S-Bpin indicates that S-Bpin has a stronger interaction with Al compared to SEBS, as predicted by DFT calculations. Although the bonding strength was improved for S-Bpin on Al, the cohesive failure was observed on the joint. The addition of SiNPs mitigates the issue and improves the cohesive force of S-Bpin by the combination of physical interactions (e.g. hydrogen bonding or van der Waals interactions) and dynamic covalent crosslinking.

Figure 4A:
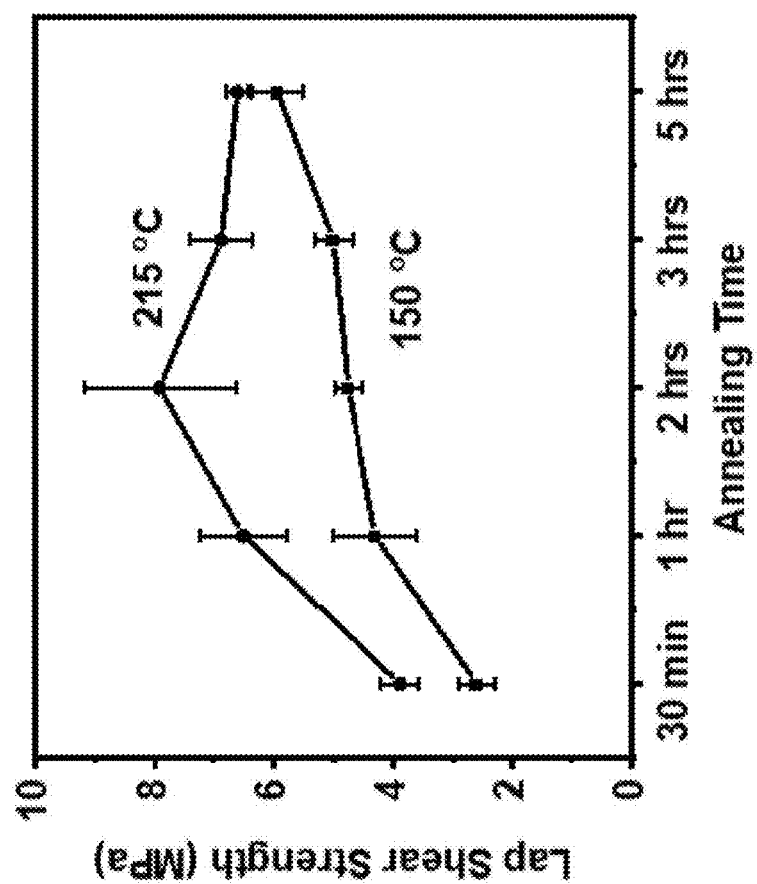
FIGS. 4A-4F. Lap shear adhesion tests.

The adhesion of 10 wt % SiNPs S-Bpin composite was initially investigated using an Al surface to understand the effect of curing time, processing temperature, and amount of adhesive. The SiNPs S-Bpin composite in THF solution with 100 mg/mL concentration was directly placed on top of the Al surface, then another Al surface was put on top and held together for 1 min and dried under vacuum at 120° C. for 4 h, and subsequently the lap shear strength was measured. The adhesion strength of the as-prepared 10 wt % SiNPs S-Bpin was around 2.5 MPa. At this curing condition, SiNPs S-Bpin composites are not fully cured, which does not provide efficient boron ester bonding with hydroxyls on the substrate, but rather allows polymer chains to move and slip easily. To explore the optimum curing time and temperature, a 10 wt % SiNPs S-Bpin composite was tested against two temperatures, 150° C. (below $T_g$) and 215° C. (above $T_g$), with different curing times under ~0.096 MPa contact pressure (FIG. 4A). With 150° C. curing temperature, the lap shear strength increased with a longer curing time. In contrast, the lap shear strength reached a maximum adhesion value after 2 h curing at 215° C. and decreased beyond 2 h curing. At 215° C., polymer chains rearrange and reach optimum curing at 2 h to provide stronger adhesion by activating chemical (dynamic B—O bond) and physical interactions (hydrogen bonding or van der Waals interaction) that enhance dynamic network adaptability and better surface wettability. The temperature above $T_g$ also allows the dynamic bonds to exchange and creates better adhesive layers with hydroxy-terminated surfaces. Curing for more than 2 h may result in over-crosslinking or partial oxidation (as observed from slight color change) that may cause the material to become brittle and decrease adhesion strength. The minimum amount of composite solution required for better adhesive properties was also investigated. The maximum adhesion was obtained for 200-300 uL of the composite solution of 100 mg/mL concentration for the 10 wt % SiNPs S-Bpin composite. Thus, all the subsequent adhesion tests were performed using 200 uL of 100 mg/mL solution onto 144 mm$^2$ area and cured for 2 h at 215° C.

Figure 4B:
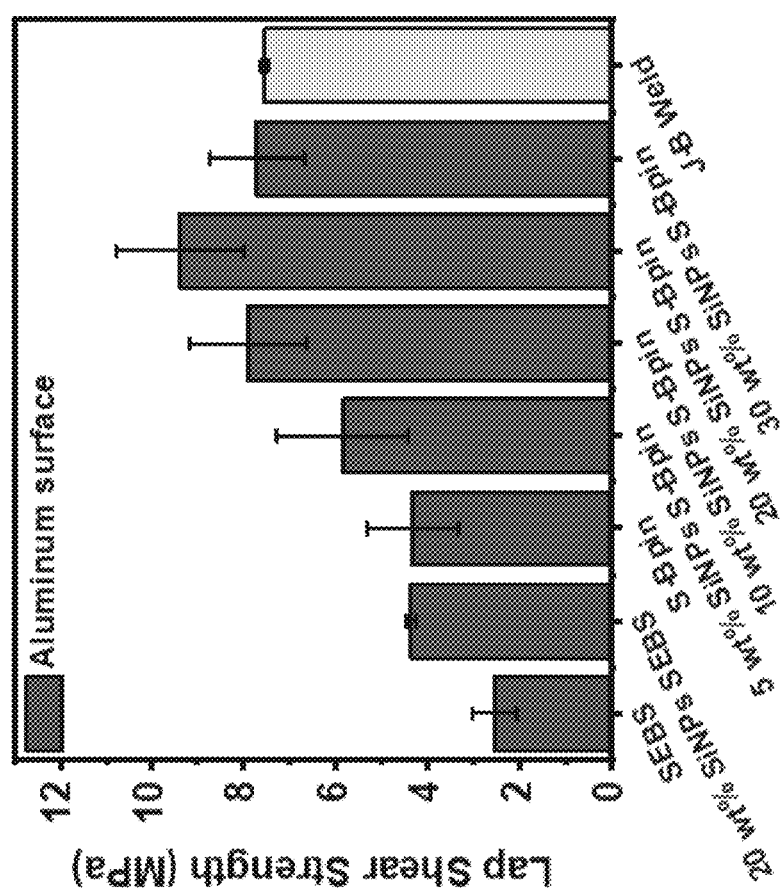
Figure 4C:
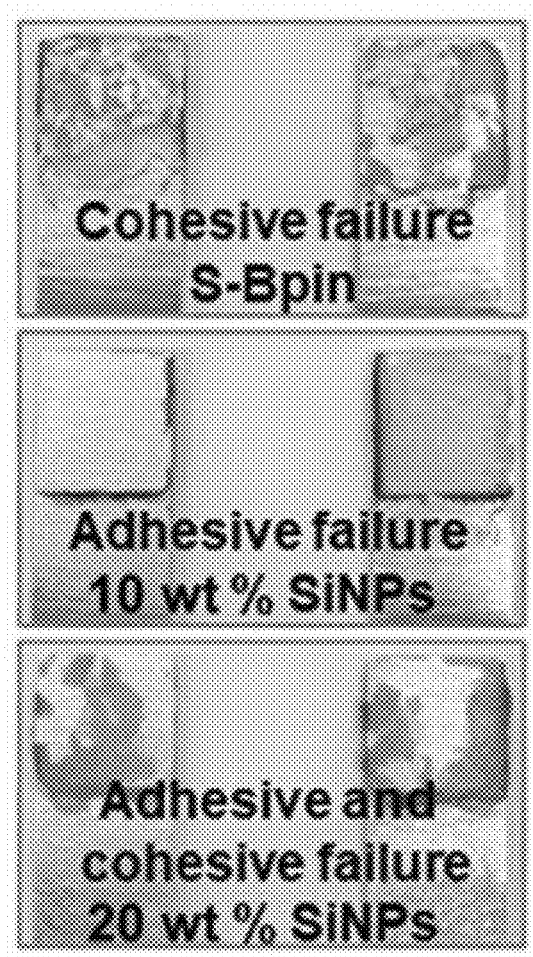

The lap shear adhesion on Al surfaces of SiNPs S-Bpin composites with different SiNPs loading corresponds well to the balance of ductility and strength, i.e., the adhesive property correlates well with enhanced mechanical properties (e.g. modulus). The lap shear strength increased from 4 MPa to 10.4 MPa with increasing SiNPs loading from 0 to 20 wt % but decreased above 20 wt % SiNPs loading, which indicates the optimum cross-link density to attain the strong-ductile adhesive property of the polymer (FIG. 4B). Increasing the amount of SiNPs improves mechanical modulus that enhances the overall mechanical strength and cohesive force of the materials, as observed in the strong cohesiveness of 10 and 20 wt % samples resulting in an adhesive failure (FIG. 4C). Above 20% SiNPs loading, the decreased ductility and cohesive force lead to a decrease in adhesive properties. Modulus at the operating condition plays an important role in the lap shear strength of an adhesive (e.g., J. Y. Chung et al., *H. Adhes.*, 81, 1119-1145, 2005). Higher modulus at operating conditions generally contributes to increasing lap shear strength. For example, the lap shear strength increases from 5.8 MPa in 5 wt % SiNPs S-Bpin to 7.9 MPa in the 10 wt % SiNPs S-Bpin, with the corresponding increase of Young's modulus from 249.5 MPa to 288 MPa. In addition, 20 wt % sample showed very high storage modulus (553 MPa) and Young's modulus (368 MPa) at room temperature and low modulus at high temperatures (above 215° C.) that favor stronger adhesive bonding. The 20 wt % SiNPs S-Bpin sample not only shows higher mechanical modulus but also provides the optimum balance of adhesive and cohesive forces, where simultaneous adhesive and cohesive failure as shown in FIG. 4C, typically corresponds to the highest adhesive strength. The lap shear adhesion of 20 wt % SiNPs SEBS was also measured and compared with 20 wt % SiNPs S-Bpin to investigate the relative contribution of the surface chemical bonding. The lap shear adhesion of 20 wt % SiNPs S-Bpin is approximately three times higher than that of 20 wt % SiNPs SEBS (FIG. 4B), which clearly indicates the strong contribution by the formation of dynamic B—O bond with hydroxy-terminated surface.

Figure 4D:
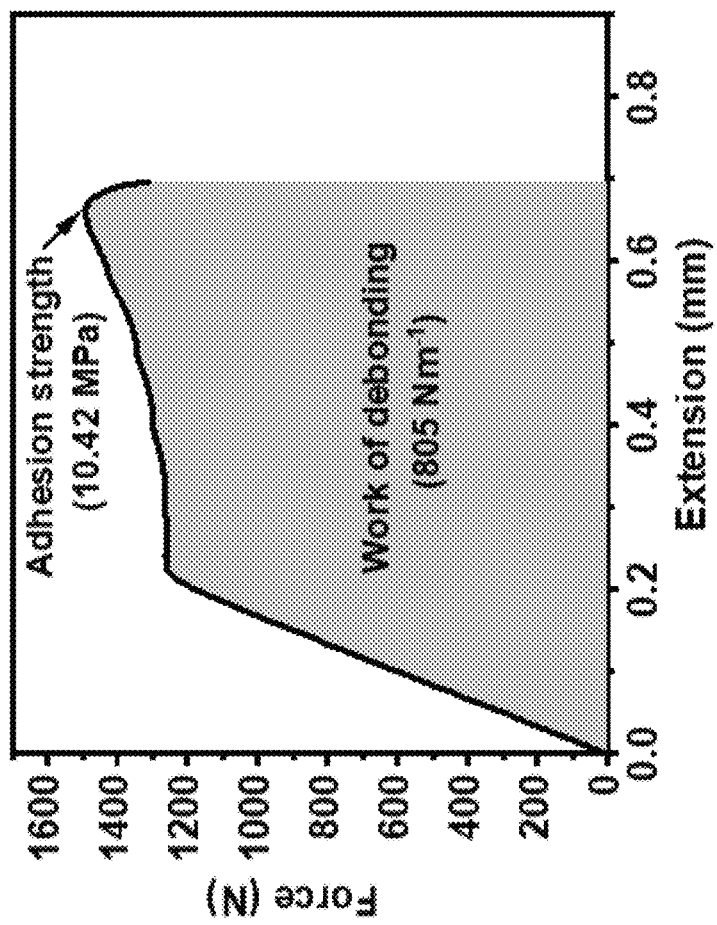
Figure 4E:
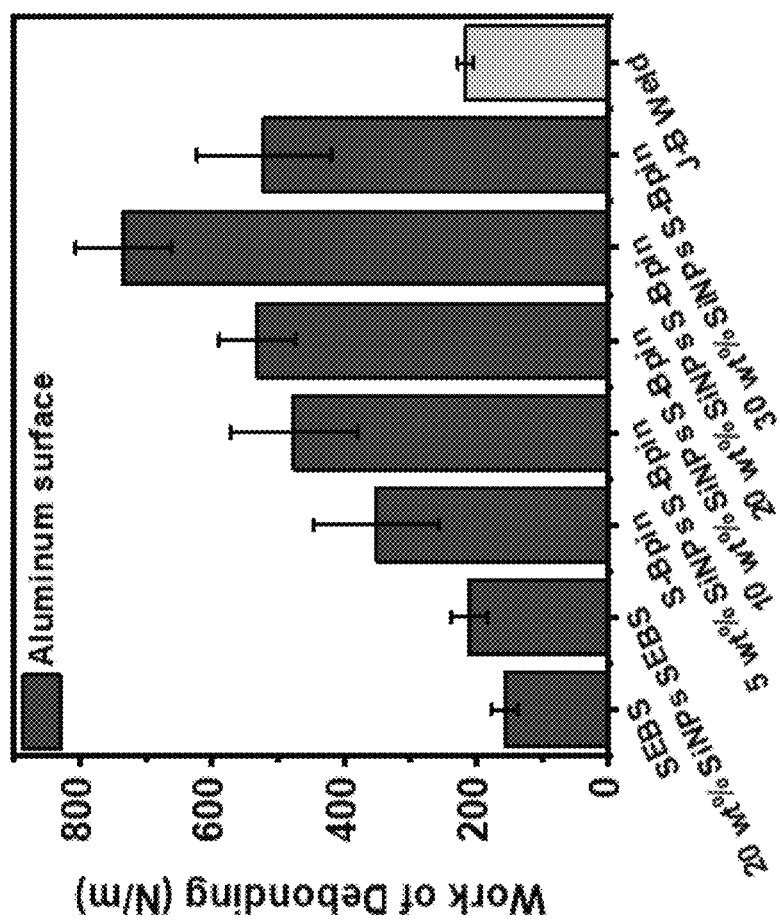

The outstanding toughness of these SiNPs S-Bpin composite adhesives was observed in force-extension curves, wherein the curves for S-Bpin and all SiNPs S-Bpin exhibit a sharp rise followed by a gradual increase in the force until failure, which suggests the presence of ductile, plastic behavior. This type of ductile adhesive behavior may not have been previously achieved in a commercial adhesive. The integrated area underneath the force-extension curve is defined as the work of debonding, or work of adhesion, i.e., energy required to break the adhesive joint (FIG. 4D). The work of debonding for all the SiNPs S-Bpin composites was calculated and compared with SEBS, 20 wt % SiNPs SEBS, and S-Bpin (FIG. 4E). The work of debonding for the 20 wt % SiNPs S-Bpin is 733.96±71.58 Nm$^{-1}$, approximately five times higher than that of SEBS (157.25 Nm$^{-1}$), more than three times higher than that of 20 wt % SiNPs SEBS (211 Nm$^{-1}$) and that of commercial J-B Weld epoxy-based glue (226.4 Nm$^{-1}$) (FIG. 4E). Most of the existing commercial adhesives are brittle, giving them lower values on the work of debonding. The incorporation of SiNPs into S-Bpin provides the increase in the modulus without losing extensibility, the work of debonding, and the overall toughness of the adhesives. The enhancement of toughness, adhesion strength, and work of debonding was achieved only after the modification of SEBS and introduction of SiNPs into the S-Bpin as they can form a strong dynamic B—O covalent bond with hydroxyl-terminated surfaces. Furthermore, the EB blocks of triblock copolymer distribute mechanical stresses to prevent sudden breakage. In contrast, boronic ester functionalized polystyrene homopolymer is too brittle, and thus, the adhesion could not be measured, which also indicates the importance of triblock copolymer architecture for leading to tough adhesives. These tough SiNPs S-Bpin composite adhesives can be applied in structural applications as they can dissipate mechanical stress throughout the joints and prevent abrupt failure. These tough adhesives will provide long-lasting high load-bearing capability and will prevent premature adhesive failures in many applications.

Figure 4F:
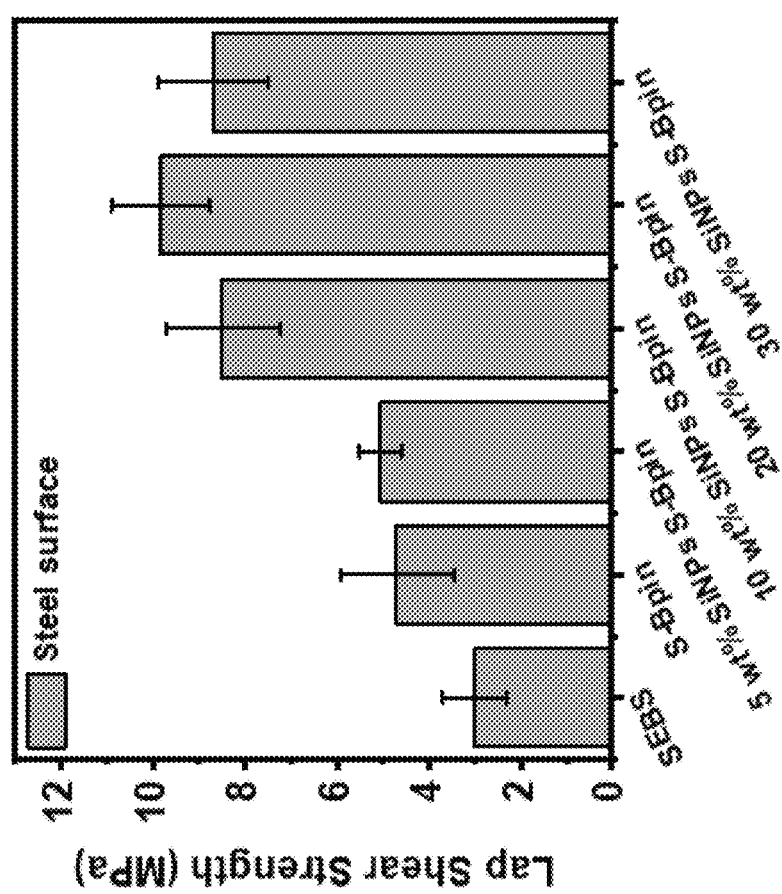

SiNPs S-Bpin composites exhibit versatile adhesion to various surfaces. The lap shear adhesion test results on a steel surface showed a similar trend to that of the Al surface (FIG. 4F). As found from a force-versus-extension curve, 20 wt % SiNPs S-Bpin composite exhibited tough adhesive performance on a steel surface, wherein the lap shear adhesion and work of debonding reached 10 MPa and 1103 Nm$^{-1}$, respectively. In the case of the glass surface, the lap shear adhesion test was first performed with (14 mm×6 mm) 84 mm$^2$ adhesive joints using 50 µL, composite solution after curing at 215° C. for 2 h. The lap shear results (FIG. 5A) show that S-Bpin and SiNPs S-Bpin composite samples have very strong adhesion on the glass surface, which is consistent with the strong binding calculated by DFT.

Figure 5F:
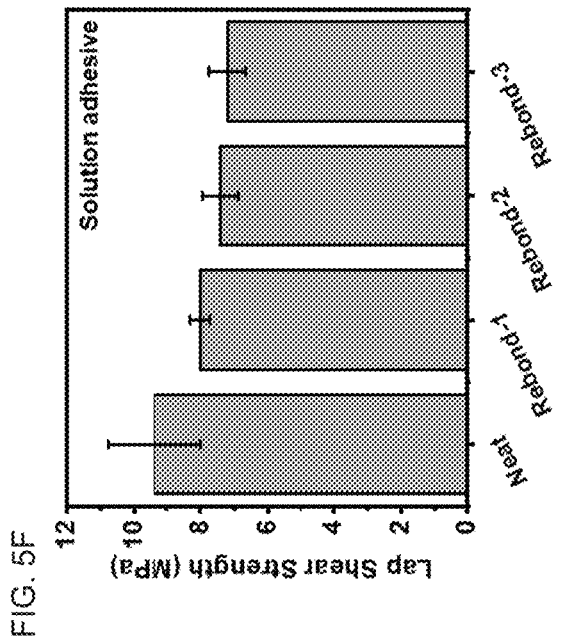
Figure 5E:
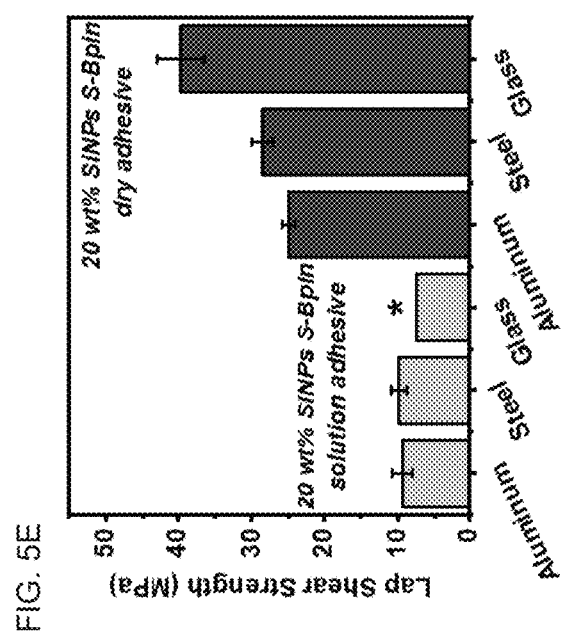

The nanocomposites with SiNPs loading above 5 wt % exhibited too strong of an adhesive force that resulted in glass substrate failure each time, while adhesive bonds remained intact (FIG. 5B). To solve this issue, a smaller area of adhesive was employed that reduced the force required to break the adhesive joints. Recently, an adhesive polymer film was utilized to test the adhesion on a very small area on glass substrates (E. Cudjoe et al., ACS Appl. Mater. Interfaces, 10, 30723-30731, 2018), and this method was used herein since controlling a smaller adhesive area is difficult for adhesive solutions. The lap shear adhesion was measured using (6 mm×6 mm) 36 mm$^2$ and (3 mm×3 mm) 9 mm$^2$ composite films with a constant film thickness of around 25-30 µm. The SiNPs S-Bpin composite film was placed between two glass sheets (FIG. 5C) and hot-pressed at 215° C. for 2 h with constant pressure (1.38 MPa). The 9 mm$^2$ bonded samples showed adhesive failure, while the 36 mm$^2$ bonded area still resulted in glass side break (structural failure). SiNPs S-Bpin composites exhibited remarkably strong bonding on the glass substrates, in which an increasing adhesion strength was achieved with an increased amount of SiNPs loading. Similar to the Al and steel surfaces, the maximum lap shear adhesion was obtained for the 20 wt % SiNPs sample, which corresponds to a value of 39.6±3.2 MPa, which is unprecedented (FIG. 5D). To compare the adhesion strength of glass with that of metals, the adhesive behavior of 20 wt % SiNPs S-Bpin composite dry adhesive film with a smaller area of 9 mm$^2$ was measured for Al and steel surfaces by the identical procedure. The lap shear strength on Al and steel surfaces was 25.01 MPa and 28.54 MPa, respectively, which is more than 10 MPa lower than the adhesion on the glass surface (39.6 MPa) (FIG. 5E). Notably, the lap shear adhesive strength of the different adhesive surface areas of 36 mm$^2$ and 9 mm$^2$ shows an insignificant difference. The exceptionally strong adhesion on glass is due to the presence of hydroxyl groups that give rise to covalent bonds with the boron ester and potential formation of additional hydrogen bonding between hydroxyl groups of the polymer nanocomposite and the glass surface. The glass surface has a higher density of hydroxyl groups per given area, leading to stronger adhesion. In addition, the surface energies for glass are higher than metals, which may lead to enhanced wetting and higher adhesion strength.

Figure 5G:
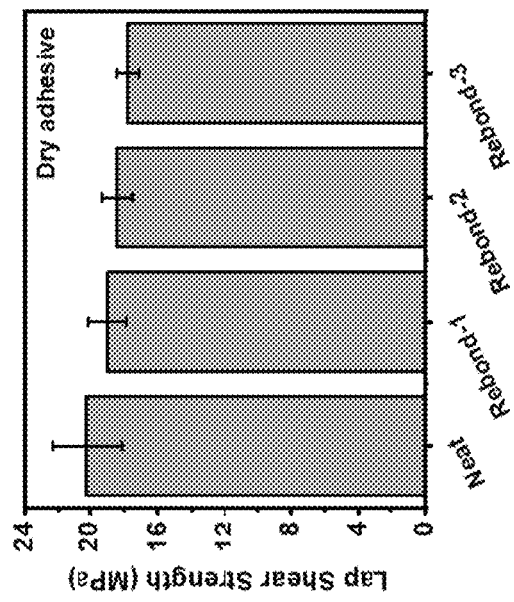

Conventional structural adhesives are single-use adhesives with irreversible adhesion, which also leave strong adhesive residues when detached. Here, SiNPs S-Bpin composite-based adhesives can be rejoined even after complete detachment due to the presence of boronic ester-based dynamic covalent bonds. The dynamic B—O bond allows rebonding and helps to dissipate energy or mechanical stresses. This is an important aspect of the developed adhesives since traditional adhesives such as epoxy and cyanoacrylate-based super glue are not capable of rebonding as they are made of permanently crosslinked materials. The rebonding capability was investigated by a repetitive sequence of breaking the lap joint at room temperature and rebonding to the Al surface at 215° C. As shown in FIGS. 5F and 5G, the 20 wt % SiNPs S-Bpin composite sample (solution and dry) showed favorable retention of lap shear adhesion even after the third rebonding cycle.

TABLE 1

Lap shear strength of commercial glues and 20 wt % SiNPs S-Bpin composite.

| Samples | Temperature (° C.) | Aluminum (MPa) | Steel (MPa) | Glass (MPa) |
|---|---|---|---|---|
| 20 wt % SiNPs (Wet Adhesive) | 23 | 9.38 ± 1.39 | 9.83 ± 1.08 | |
| 20 wt % SiNPs (Dry Adhesive) | 23 | 25.01 ± 0.92 | 28.54 ± 1.45 | 39.6 ± 3.2 |
| Ethylcyanoacrylate (Loctite Super Glue) | 23 | 9.25 ± 0.96 | 17.6 ± 1.4 | 6.5 ± 1.2 |
| Epoxy (J-B Weld) | 23 | 7.55 ± 0.07 | 6.50 ± 0.50 | 9.40 ± 0.35 |
| Gorilla Glue | 23 | 10.1 ± 2.7 | 13.9 ± 0.2 | 6.60 ± 0.67 |
| Elmer's Glue All | 23 | 2.73 ± 1.2 | 2.19 ± 0.5 | Not tested |

TABLE 1-continued

Lap shear strength of commercial glues and 20 wt % SiNPs S-Bpin composite.

| Samples | Temperature (° C.) | Aluminum (MPa) | Steel (MPa) | Glass (MPa) |
| --- | --- | --- | --- | --- |
| 20 wt % SiNPs (Wet) | 95 | 4.13 ± 0.26 | 4.1 ± 0.28 | Not tested |
| 20 wt % SiNPs (Dry) | 95 | 8.66 ± 0.88 | 11.4 ± 1.01 | Not tested |
| Epoxy (J-B Weld) | 95 | 1.73 ± 0.05 | 2.04 ± 0.65 | Not tested |

Figure 5I:
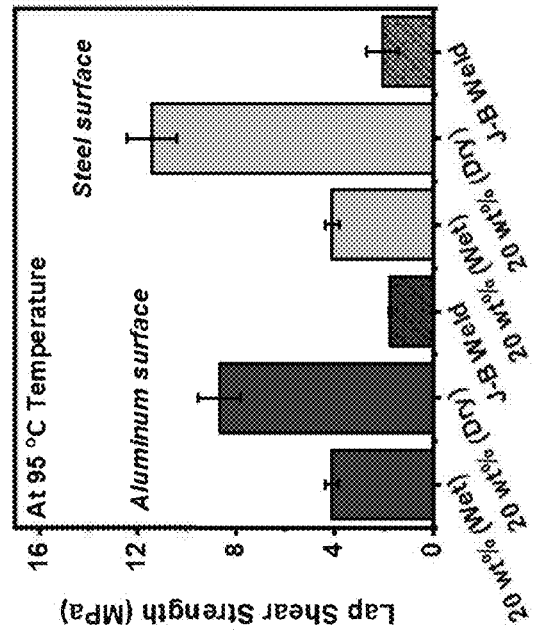
Figure 5H:
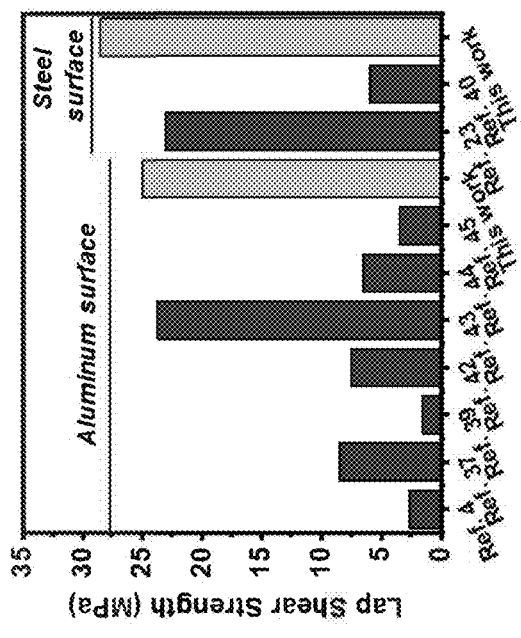

To evaluate the efficacy of the biomimetic multi-phase composite-based adhesive for practical applications, their adhesion strength was compared with widely used commercial glues (Table 1) and recently reported dynamic polymer-based adhesives (FIG. 5H). In addition to a typical melt adhesive SEBS, four different types of representative adhesives including Loctite super glue (ethyl cyanoacrylate), J-B Weld (epoxy), Gorilla Glue (polyurethane), and Elmer's Glue (polyvinyl acetate) were tested for the lap shear adhesion on Al, steel, and glass surface with (12 mm×12 mm) 144 mm$^2$ adhesive area, where two substrates were joined at room temperature (23° C.) following the manufacturer recommended procedure. The adhesion results shown in Table 1 demonstrate that the SiNPs S-Bpin composite-based adhesives exhibit significantly greater adhesion strength, compared to commercial adhesives and most of the reported adhesives with dynamic covalent bonds (FIG. 5H). In particular, the adhesion property of the dry adhesive based on the 20 wt % SiNPs S-Bpin composite widely exceeds these four commercial adhesives, and also maintains a very strong lap shear adhesion at 95° C. on Al (8.66 MPa) and steel (11.4 MPa) surfaces (FIG. 5I and Table 1) that is ~5 times higher than that of the representative thermoset adhesive, J-B Weld of 1.73 MPa on Al and 2.04 MPa on steel surface. Notably, the other commercial adhesives including SEBS, and Elmer's glue could not be measured at 95° C. since their lap shear adhesion strength at 95° C. was too weak to be measurable. The high adhesion strength of SiNPs S-Bpin composites at high temperature may open up many applications that require maintaining strong bonding at high temperature.

Figure 5J:
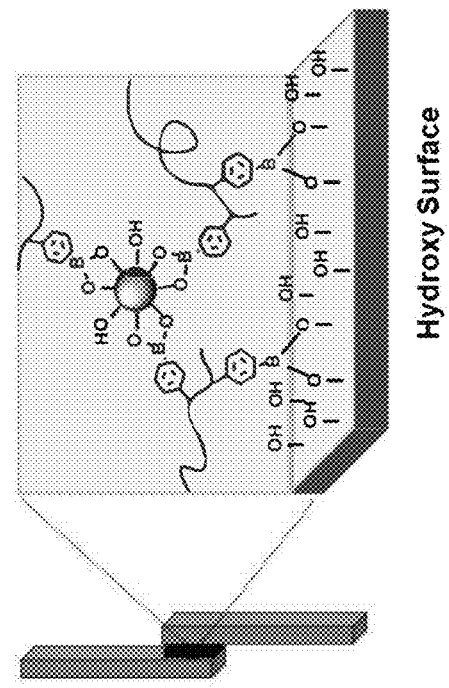

The remarkably strong and tough adhesive with rebonding ability of multi-phase composites indicates the great potential of the biomimetic strategy used for this study. FIG. 5J schematically proposes a possible mechanism of adhesion for the SiNPs S-Bpin composite adhesive. The mechanism may operate by mussel-mimicking dynamic chemical bonding (B—O bond) and physical bonding (H-bond or van der Waals interaction) between the hydroxy-terminated substrates and adhesives. Such dynamic physical and chemical bonding facilitates the surface contact at macroscopic and microscopic scales, which leads to the enhanced adhesive strength. Moreover, the nacre-mimicking multiphase composite structure, including the presence of dynamic covalent interactions within the matrix and with the substrate surface, coupled with triblock architecture provided such strong and tough adhesion. The high adhesion strength of S-Bpin composite relative to commercial adhesives also suggests the efficacy of biomimetic multiphase composites with dynamic reversible bonds as a new design of adhesive materials.

Adaptability with Various Fillers

This study has demonstrated that boronic ester on S-Bpin can be readily crosslinked with hydroxy groups on the surface of various fillers; therefore, the concept should be applicable beyond SiNPs. To further demonstrate the potentials of S-Bpin or boronic ester functionalized polymer in general, other fillers having hydroxyl groups on the surface were incorporated into S-Bpin. Four types of S-Bpin based composites were synthesized by dispersing 2.5 and 5 wt % of several μm size fillers, including 3M glass beads (diameter 20-40 μm), glass fibers (diameter 11-14 μm), cellulose microcrystals (20 μm size), and cellulose microfiber (medium size) into the 100 mg/mL THF solution of S-Bpin. A limited amount of fillers was incorporated to fabricate these composites due to the inability to completely disperse fillers at higher loadings. Similar to the SiNPs, these fillers likely also form covalent crosslinking with S-Bpin via the boron transesterification reaction, as they also have hydroxyl groups. The composites with these fillers also exhibited significantly higher tensile strength with slightly decreased elongation at break compared to that of S-Bpin. Following the optimized condition, the lap shear adhesion was measured on an Al substrate using both composite film and solution. The lap shear adhesion results indicate that all the fillers exhibit a strong adhesive property on an Al surface (e.g., 5-20 MPa) while the values were lower than those of SiNPs probably due to the better dispersity and higher surface area of SiNPs samples than the composites with micrometer scale fillers.

CONCLUSIONS

The present disclosure demonstrated a biomimetic multi-phase design strategy for preparing exceptionally tough adhesives with reprocessability. The incorporation of dynamic boronic ester-based functional groups into SEBS, a commodity thermoplastic elastomer, formed dynamic exchangeable covalent bonds with hydroxyl groups on the surface of diverse fillers and substrates, which were further confirmed by DFT calculations. The dynamic interaction between SiNPs and S-Bpin matrix reinforced the triblock copolymer network and significantly enhanced their tensile strength, toughness, and temperature service window while maintaining recyclability. Their mechanical robustness coupled with unveiled dynamic interaction with hydroxyl groups on various oxide surfaces led to enhanced adhesive strength, toughness, and debonding energy. Notably, 20 wt % SiNPs S-Bpin composite provided the balance between cohesive and adhesive forces and exhibits remarkably strong adhesion and work of debonding with Al, steel, and glass surfaces. The dynamic boronic ester functionalization coupled with SEBS structure with SiNP fillers results in a remarkably strong and tough adhesive (e.g., data in FIG. 1), which provides a straight-forward approach for the preparation of load-bearing tough adhesives. The unprecedented tough adhesion characteristics at both room and elevated temperature in this study surpass those of many existing commercial adhesives.

While there have been shown and described what are at present considered the preferred embodiments of the invention, those skilled in the art may make various changes and modifications which remain within the scope of the invention defined by the appended claims.

What is claimed is:

1. A crosslinked adhesive composition comprising:
   (i) a polymer matrix;
   (ii) solid particles dispersed throughout the polymer matrix and having a metal oxide composition; and
   (iii) a multiplicity of boronate linkages crosslinking between the polymer matrix and solid particles, wherein the boronate linkages have the formula

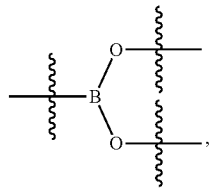 [SMILES: *OB(*)O*]

wherein the polymer matrix and particles are connected to each other through the boronate linkages, and the crosslinked adhesive composition has an ability to bond surfaces.

2. The composition of claim 1, wherein the composition has a further ability to thermally debond and rebond the surfaces.

3. The composition of claim 1, wherein the polymer matrix is a thermoplastic polymer.

4. The composition of claim 1, wherein the polymer matrix is an elastomeric polymer.

5. The composition of claim 1, wherein the polymer matrix is attached to the boron atom of the boronate linkage and the solid particles are attached to the oxygen atoms of the boronate linkage.

6. The composition of claim 1, wherein the polymer matrix contains aromatic groups attached to the boronate linkage.

7. The composition of claim 6, wherein the polymer matrix is polystyrene or a copolymer thereof.

8. The composition of claim 1, wherein the solid particles have a size of 1-100 nm.

9. The composition of claim 1, wherein the solid particles have a size of 1-100 microns.

10. The composition of claim 1, wherein the metal oxide composition is selected from the group consisting of silica, alumina, yttria, zirconia, and titania.

11. The composition of claim 1, wherein the solid particles have an organic composition.

12. The composition of claim 11, wherein the organic composition is selected from natural and synthetic polymers.

13. The crosslinked adhesive composition of claim 1, wherein the crosslinked adhesive composition excludes solvents.

* * * * *